(12) United States Patent
Nishihara et al.

(10) Patent No.: US 7,127,997 B2
(45) Date of Patent: Oct. 31, 2006

(54) FRICTION DRIVE CONVEYOR

(75) Inventors: Shigeyoshi Nishihara, Shiga (JP);
Hiroyuki Murakami, Shiga (JP);
Kazuhiko Miyoshi, Shiga (JP);
Susumu Morita, Shiga (JP); Toshiyuki Iba, Osaka (JP); Junji Obata, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/863,572

(22) Filed: Jun. 8, 2004

(65) Prior Publication Data
US 2004/0261648 A1 Dec. 30, 2004

(30) Foreign Application Priority Data

| | | | |
|---|---|---|---|
| Jun. 27, 2003 | (JP) | | 2003-184806 |
| Jun. 27, 2003 | (JP) | | 2003-184807 |
| Jun. 27, 2003 | (JP) | | 2003-184808 |
| Jun. 27, 2003 | (JP) | | 2003-184809 |

(51) Int. Cl.
*B61B 3/00* (2006.01)
*E01B 25/22* (2006.01)

(52) U.S. Cl. ............................................. 104/89
(58) Field of Classification Search ............ 104/89, 104/91, 96, 98, 106, 172.1, 172.4
See application file for complete search history.

(56) References Cited

U.S. PATENT DOCUMENTS 4,424,749 A * 1/1984 Wakabayashi ........... 104/172.4
5,511,487 A * 4/1996 Sakagami et al. .......... 104/252
5,690,032 A * 11/1997 Koga et al. ............... 104/172.1
6,192,803 B1 * 2/2001 Nishino ....................... 104/93
6,494,142 B1 * 12/2002 Masugaki et al. .......... 104/168

\* cited by examiner

Primary Examiner—S. Joseph Morano
Assistant Examiner—Robert J. McCarry, Jr.
(74) Attorney, Agent, or Firm—Schweitzer Cornman Gross & Bondell LLP

(57) ABSTRACT

The present invention relates to a friction drive conveyor including carriers 1, which can be propelled along a track by frictional wheels 30 fitted along the track. Each frictional wheel 30 can be driven by a brakeless motor 29. A sensor 32 senses whether each frictional wheel 30 is in contact with any one frictional surface 15 of the carriers 1. The track includes a section along which the frictional wheels 30 are supported at regular intervals equal to or slightly shorter than the total length L of the frictional surfaces 15 on each side of each carrier 1. On the basis of a signal output from each sensor 32, a controller 24 so controls the associated brakeless motor 29 as to start rotating the associated frictional wheel 30 in contact with any one frictional surface 15 when the forward next wheel 30 gets free of the frictional surfaces 15, and as to stop driving the frictional wheel 30 having got free of the frictional surfaces 15.

12 Claims, 15 Drawing Sheets

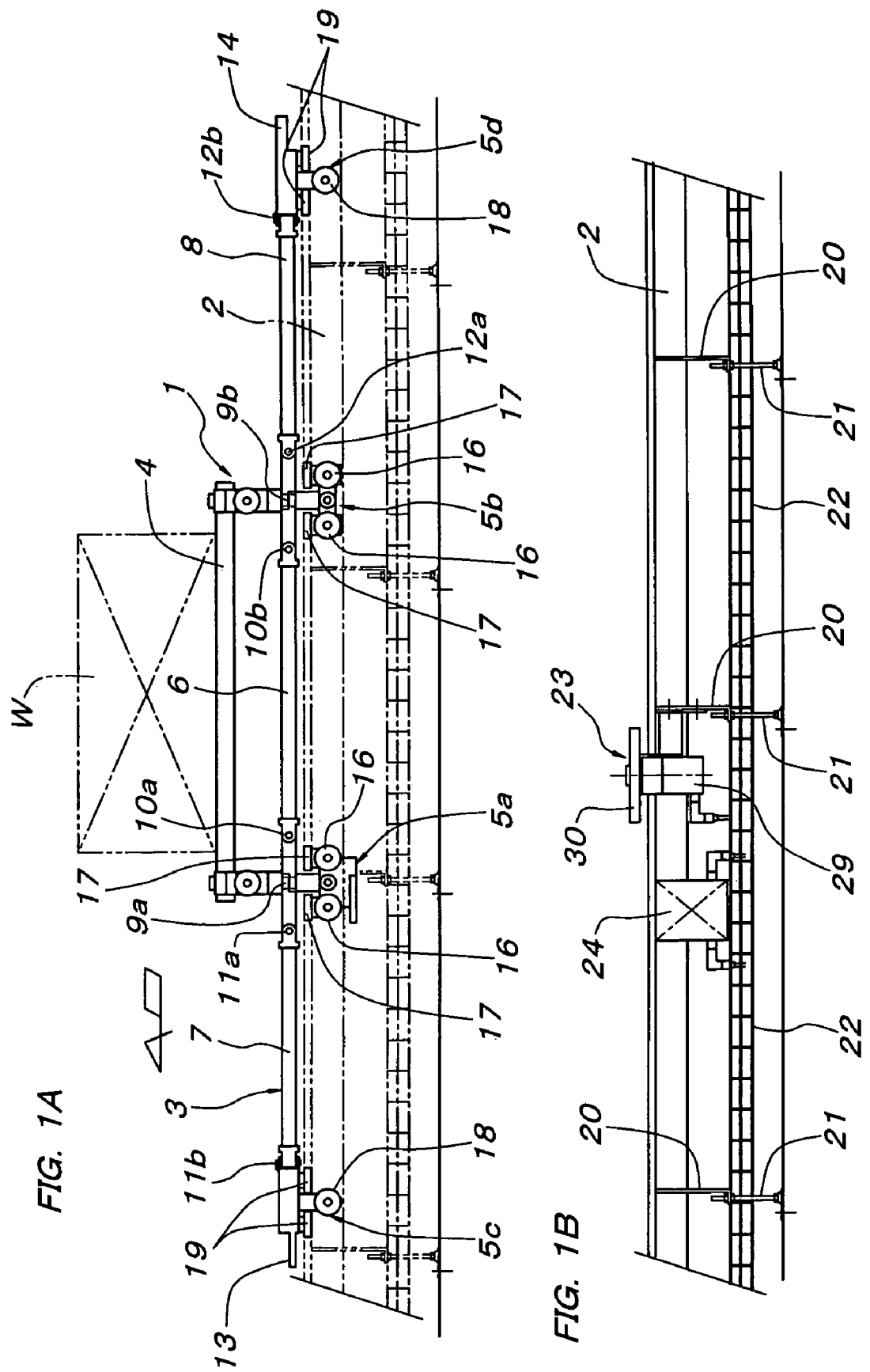

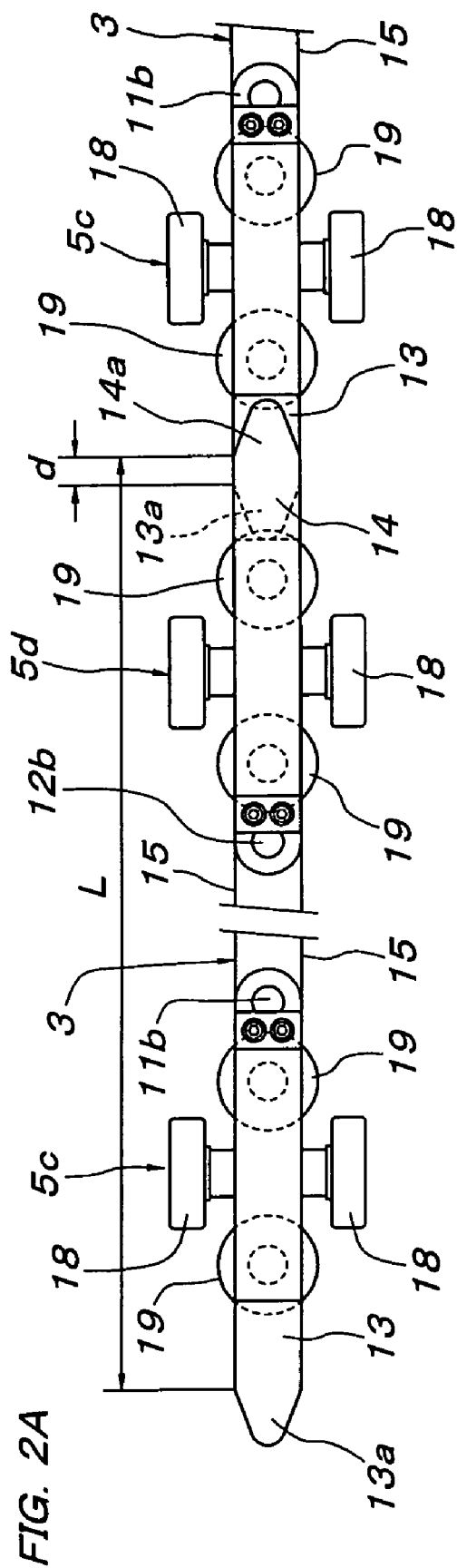
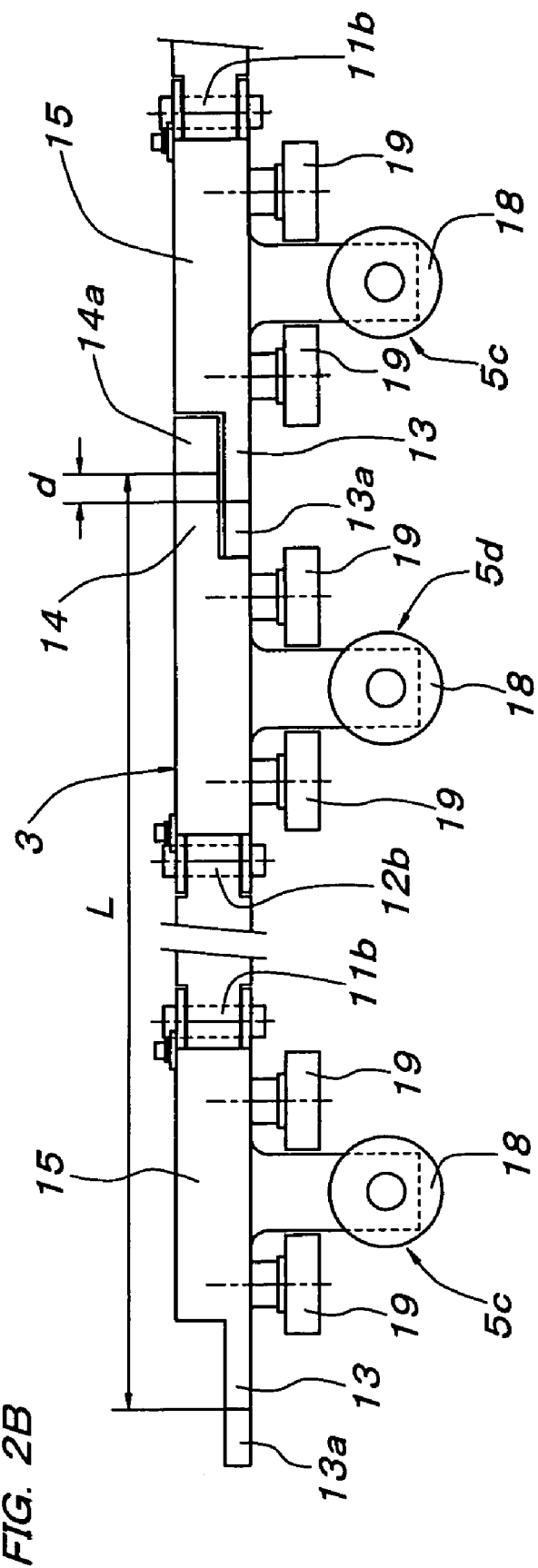
FIG. 2A
FIG. 2B

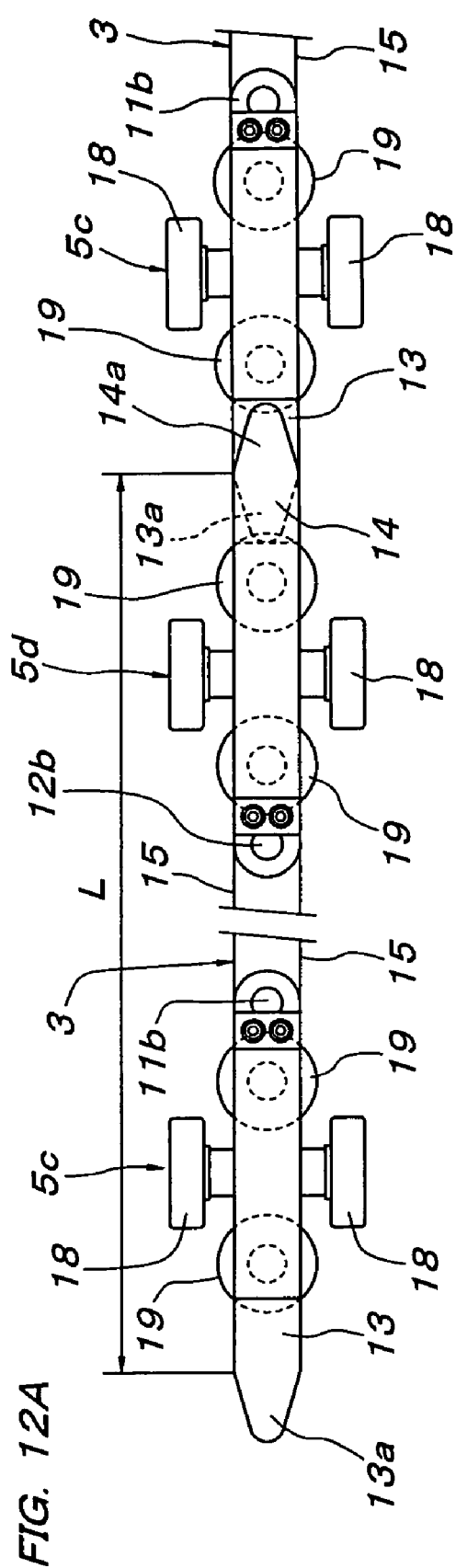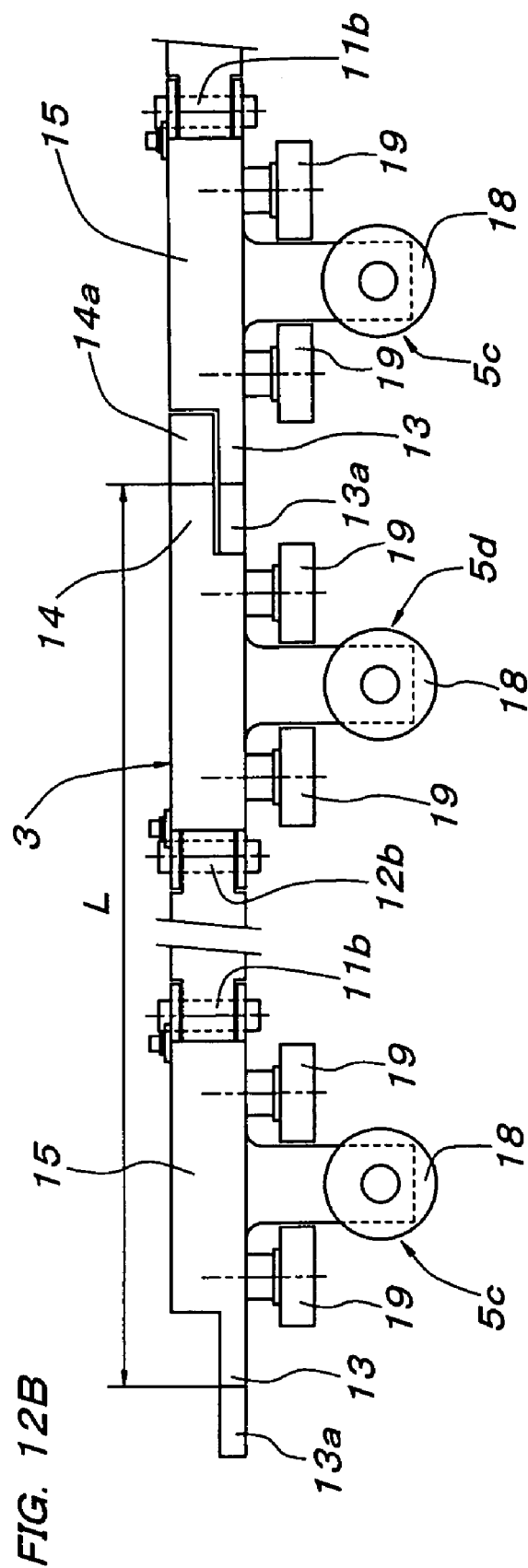
FIG. 12A
FIG. 12B

FRICTION DRIVE CONVEYOR

FIELD OF THE INVENTION

The present invention relates to a friction drive conveyor including carriers, which can be propelled along a track by frictional wheels fitted along the track.

PRIOR ART

A friction drive conveyor of this type is disclosed in Japanese Unexamined Patent Publication No. 2003-54731. This conveyor includes a carrier that runs in a running direction along a track. The carrier includes a load bar extending in the running direction. The load bar has a linear frictional surface formed on one side except for both end portions. Drive units are fitted along the track and each include a frictional wheel for rotating in contact with the frictional surface. The end portions of the load bar are tapered (arcuate or V-shaped) for smooth contact with the frictional wheels and another reason. The frictional wheels are spaced at regular intervals equal to the whole length of the load bar, which is longer than the whole length of the frictional surface. In other words, the whole length of the frictional surface is shorter than the wheel intervals.

Consequently, there may be a case where one of the frictional wheels is in contact with the front end portion of the load bar, while another of the frictional wheels is in contact with the rear end portion of the load bar, and no frictional wheels are in contact with the frictional surface. In this case, the frictional wheel in contact with the front tapered end portion of the load bar may slip on it, so that the rotation of this wheel may not be able to reliably drive the carrier forward.

This conveyor solves the foregoing problem by means of a timer. The timer delays, for a preset time, the stopping of the frictional wheel in contact with the rear tapered end portion of the load bar so that the rotation of this wheel can drive the bar as forward as possible until the wheel stops. However, this may be insufficient to drive the load bar forward as reliably and strongly as the frictional wheel drives the linear frictional surface of the load bar. In addition, the inclusion of the timer in the conveyor raises the cost of the conveyor.

Of course, the wheel intervals might be shorter than the whole length of the frictional surface of the load bar. In this case, however, two or more frictional wheels would be in contact with the load bar at the same time, so that the driving control of the wheels would be complex. In addition, the frictional wheels and the motors for driving them would increase in number. As a result, the cost of the conveyor would rise greatly, and the utility of the conveyor would decrease.

SUMMARY OF THE INVENTION

One object of the present invention is to provide a friction drive conveyor that can solve the foregoing problem. In other words, the object of the invention is to simplify the driving control of the frictional wheels of the conveyor, thereby reducing the cost of the conveyor.

A friction drive conveyor according to one aspect of the present invention comprises carriers, frictional wheels, sensors and a controlling means. The carriers run in a running direction along a track. Each of the carriers has a frictional surface extending in the running direction. The frictional wheels can rotate in contact with the frictional surfaces of the carriers to propel the carriers along the track. The track includes a section along which the frictional wheels are supported at regular intervals, which are equal to or shorter than the length of the frictional surfaces. Each of the frictional wheels can be rotated by a brakeless motor. Each of the sensors senses whether one of the frictional wheels is in contact with any of the frictional surfaces. On the basis of the sensor signals output from the sensors, the controlling means so controls the brakeless motors for the frictional wheels as to start rotating the frictional wheel in contact with any of the frictional surfaces when the forward next frictional wheel gets free of the frictional surfaces, and as to stop rotating the frictional wheels having got free of the frictional surfaces.

Thus, on the basis of the sensor signals output from the sensors, which are provided for the respective frictional wheels, the controlling means causes the frictional wheel in contact with any of the frictional surfaces to start rotating when the forward next wheel gets free, and also causes the frictional wheels having got free of the frictional surfaces to stop rotating. Only such very simple control enables the carrier at any one of the frictional wheels to move forward when the forward next wheel gets free.

The means for driving the frictional wheels are brakeless motors. When the frictional surface of any one of the moving carriers rotates any one of the frictional wheels not driven, the counter torque of the associated motor is small, so that the inertia of the carrier moves it easily after the frictional wheel stops. The wheel intervals are equal to or shorter than the length of each of the frictional surfaces. These solve the problem that might be caused if the wheel intervals were longer than the length of each of the frictional surfaces, as is the case with the conveyor disclosed in the publication mentioned above. Specifically, in the disclosed conveyor, if the linear frictional surface of any carrier is present between two adjacent frictional wheels, the carrier may not be driven reliably when the forward frictional wheel starts rotating.

In the conveyor according to the present invention, if the wheel intervals are shorter than the length of each of the frictional surfaces, the inertia of each of the carriers may be too small for the carrier between two adjacent frictional wheels to move forward until the rear end of its frictional surface leaves the backward frictional wheel. Even in this case, the front end of the (linear) frictional surface reliably comes into contact with the forward frictional wheel, which can reliably propel the carrier.

The wheel intervals may be substantially equal to the length L of the frictional surfaces. There may be a case where, after the frictional wheel driving any one of the carriers stops rotating, the inertia of the carrier moves it only slightly. Even in this case, because the wheel intervals are substantially equal to the surface length L, the frictional wheel can reliably move the frictional surface of the carrier forward off it and can bring the front end of this surface into contact only with the forward next wheel. This enables any one of the frictional wheels to more reliably start driving any one of the carriers, without the stopping backward next wheel resisting the movement of the carrier.

Each of the carriers may include a load bar, on one side of which the associated frictional surface extends. The load bar includes a forward protrusion and a backward protrusion. The forward protrusion protrudes from the front end of the load bar at a first height. The backward protrusion protrudes from the rear end of the load bar at a second height different from the first height. The frictional surface extends into the two protrusions. When any one of the carriers is closest to the preceding carrier, the load bars of the two carriers are in end-to-end contact with each other, and one of the adjacent protrusions of the two load bars is positioned under the other. When the two load bars are in end-to-end contact with each other, adjacent end portions of the frictional surfaces of the two bars overlap with each other by a distance "d" in the running direction. It is preferable that the wheel intervals D be shorter than the length L of the frictional surface of each of the load bars by the distance "d".

The wheel intervals may be equal to the length of the frictional surfaces. In this case, if a plus error occurs in the wheel intervals, whether it is slight or not, any one of the carriers may stop between two adjacent frictional wheels, without being able to be driven frictionally. This requires the wheel intervals to be accurate.

If the wheel intervals are shorter than the length of the frictional surface of each of the load bars by the distance "d", the surface can be in contact with two adjacent frictional wheels at the same time. Accordingly, any slight plus error occurring in the wheel intervals causes no hindrance, so that the frictional wheels are easy to fit. In this case, if some of the carriers are in storage in part of the track, with their load bars in end-to-end contact with one another, only one of the frictional wheels can be in contact with the frictional surface of each of these load bars. This makes it simple and easy to so control each of the frictional wheels as to deliver the carriers in storage one after one, as is the case if the wheel intervals are equal to the surface length.

Each of the frictional wheels and the associated brakeless motor and sensor may form parts of a drive unit. The controlling means for controlling the brakeless motors for driving the frictional wheels may be a computer or another central control unit, which is installed away from the track. The control unit is connected by a cable to at least the drive units in the section along which the wheel intervals are regular and equal to or shorter than the length of the frictional surfaces.

Alternatively, the controlling means may include controllers, each of which independently controls one of the frictional wheels. The controller for each of the frictional wheels outputs a control signal based on the sensor signal from the associated sensor. The controller for each of the frictional wheels is connected to the controller for the backward next frictional wheel by a cable so that the control signal from the controller for each of the frictional wheels can be sent to the controller for the backward next frictional wheel through the associated cable. Each of the controllers may be simple and include a relay circuit. The controllers can be interconnected simply by one cable (which may be separate from the DC power cables for control circuits) extending along the track. This makes the wiring operation very simple and easy, and simplifies changes in the layout of the track.

The conveyor may further include switching means each for disconnecting from one of the controllers the two cables connected to the controller, and for connecting the disconnected cables directly to each other. If any one of the frictional wheels cannot be used normally due to trouble or the like, the associated switching means can disconnect from the associated controller the two cables connected to the controller, and can connect the disconnected cables directly to each other. There may be a case where any one of the carriers stops at the unusable frictional wheel. Only by moving this carrier to the forward next frictional wheel either manually or automatically, it is possible to frictionally drive the other carriers by the expected automatic control along the sections where the normal frictional wheels are supported. The carrier may be moved automatically by being pushed by the succeeding carrier. As a result, it is possible to avoid great economic damage that would be caused if the whole track could not be used until the drive unit with the unusable frictional wheel is repaired.

Specifically, each of the switching means may be a connector for directly connecting the two cables disconnected from the associated controller. The use of the connector makes it possible to remove the controller together with the associated frictional wheel and brakeless motor if the wheel becomes unusable. The removed controller, wheel and motor can be inspected and repaired. Accordingly, the use of the connector also makes it possible to cope with a case where the controller has made the frictional wheel unusable. The connectors for the controllers are particularly effective if each of the frictional wheels and the associated motor and controller can be fitted together to and removed together from the right or left guide rail (for example, if each of the frictional wheels and the associated motor and controller are fitted on a removable board).

Alternatively, each of the switching means may be a switching circuit incorporated in the associated controller. The switching circuit changes over between a first state and a second state. In the first state, the switching circuit allows the control signal on the control cable connected to the forward next controller to be input into a control circuit, and also allows the control signal from the control circuit to be output to the control cable connected to the backward next controller. In the second state, the switching circuit does not allow the control signal on the control cable connected to the forward next controller to be input into the control circuit, but allows it to be output directly to the control cable connected to the backward next controller. The use of the switching circuit makes it possible to remove only the drive unit including the associated frictional wheel and brakeless motor, without removing the associated controller, if it is obvious that something in or of the drive unit has made the wheel unusable. This makes the removing and fitting operation easy and efficient.

Of course, each of the switching means is more effective if it is a combination of a connector and a switching circuit as described above.

Basically, the conveyor conveys the carriers in sequence, without two adjacent frictional wheels driving the frictional surface of each of the carriers at the same time. It is scarcely possible for the whole length of the track to be an integral number of times the wheel intervals, which are determined from the length of the frictional surfaces. Practically, the track includes a section where the wheel intervals are shorter than the surface length.

In general, drive units including frictional wheels are fitted on yokes, to which guide rails are fixed, and which are positioned at intervals along the rails. For example, some of the yokes are positioned at shorter intervals along the horizontal curved and other paths of a track than other yokes are positioned along the linear paths of the track. Accordingly, the length of the frictional surfaces of carriers may be longer than the intervals at which the frictional wheels of the drive units in the curved and other paths are positioned.

Thus, the track may include at least one section where the wheel intervals are shorter than the length of the frictional surfaces of carriers. Any one of the carriers may stop with its frictional surface in contact with two adjacent frictional wheels in this section. Subsequently, when the forward next frictional wheel gets free, the frictional wheel stopping in contact with a front end portion of the frictional surface is rotated. When the frictional wheel in contact with the front end portion is rotated, the wheel stopping in contact with a rear end portion of the frictional surface is resistant for a long time. This prevents the carrier from starting smoothly and/or accelerates the wear of the frictional wheels and the frictional surfaces.

Another object of the present invention is to provide a friction drive conveyor that can solve this problem.

A friction drive conveyor according to another aspect of the present invention includes carriers movable in a running direction along a track. Each of the carriers has a frictional surface extending in the running direction. The track includes a first section and a second section. The conveyor further includes first and second frictional wheels. The first frictional wheels can rotate in contact with the frictional surfaces of the carriers to propel the carriers along the first section. The first frictional wheels are supported at regular intervals along the first section, which are not longer than the length of the frictional surfaces. The second frictional wheels can rotate in contact with the frictional surfaces to propel the carriers along the second section. The second frictional wheels are supported at intervals along the second section, which are shorter than the regular intervals. Each of the first frictional wheels can be rotated by a brakeless motor. The second frictional wheels can be rotated by at least one motor. The conveyor further includes a first sensing means and a second sensing means. The first sensing means includes first sensors, each of which senses whether one of the first frictional wheels is in contact with any of the frictional surfaces. Each of the first sensors outputs a first sensor signal. The second sensing means senses whether any of the carriers is present in the second section. The conveyor further includes a first controlling means and a second controlling means. On the basis of the first sensor signals from the first sensors, the first controlling means so controls the brakeless motors for the first frictional wheels as to start rotating the first frictional wheel in contact with any of the frictional surfaces when the forward next frictional wheel gets free of the frictional surfaces, and as to stop rotating the first frictional wheels having got free of the frictional surfaces. The second controlling means regards all the second frictional wheels as one of the first frictional wheels and so controls the second frictional wheels that the carriers can run along the second section like the carriers move in the first section.

Carriers can be moved forward in sequence along the first section in such a manner that each of the first frictional wheels can drive the carrier in contact with it only when the forward next wheel gets free of the frictional surface of the preceding carrier. The carrier having reached the rear end of the second section can be driven into this section only when the whole of the section gets free. The track may include a first section forward next to the second section. In this case, the carrier having entered the second section can be driven out of it only when the most backward frictional wheel in the first section gets free.

Even in a track along the whole of which the frictional wheels cannot be supported at regular intervals, it is possible to perform simple friction drive control for moving each of the carriers forward by means of any one of the frictional wheels if the forward next wheel gets free. Even in the second section, where the wheel intervals are shorter, the carriers can be driven well without inconvenience that would otherwise be caused if two or more frictional wheels are in contact with the frictional surface of one carrier.

There may be a friction drive conveyor including frictional wheels supported by guide rail yokes fixed at short intervals along a horizontal curved path of a track. There may be a friction drive conveyor including frictional wheels that cannot be supported at regular intervals along the whole length of a track because pieces of peripheral equipment are installed in the track or because of the length of the track. The present invention can be applied to these conveyors as well, which can perform its basic operation as described already.

The second control means may start and stop rotating all the second frictional wheels in a batch. This batch control is simpler than starting and stopping rotating all the second frictional wheels in sequence while any of the carriers is running through the second section. In terms of hardware, the batch control avoids the need to provide a carrier sensor for each of the second frictional wheels.

The second sensing means may include second sensors each provided for one of the second frictional wheels. Each of the second sensors outputs a second sensor signal. On the basis of the logical sum of the second sensor signals from the second sensors, the second control means starts and stops rotating the second frictional wheels in a batch. In this case, the second frictional wheels can be identical with the first frictional wheels, for each of which one of the first sensors is provided. Because the second control means controls the second frictional wheels on the basis of the logical sum of the second sensor signals, it is possible to start and stop rotating the second frictional wheels in a batch by the control process described above.

The first and second controlling means may be a computer or another central control unit, which is installed away from the track. All the first and second frictional wheels may form parts of a drive unit, which is connected to the central control unit by a cable.

Alternatively, the first controlling means may include first controllers, each of which controls one of the first frictional wheels and outputs a first control signal based on the associated first sensor signal. The second controlling means may be a second controller, which controls the second frictional wheels and outputs a second control signal based on the second sensor signal. The controller for one of the first and second frictional wheels is connected to the controller for the backward next wheel by a cable so that the control signal from the controller for each of the frictional wheels can be sent to the controller for the backward next wheel through the associated cable. Each of the controllers may be simple and include a relay circuit. The controllers can be interconnected simply by one cable (which may be separate from the DC power cables for control circuits) extending along the track. This makes the wiring operation very simple and easy, and simplifies changes in the layout of the track.

The track of each of the conveyors may include guide rail units of a suitable length, which are connected end to end along the track. Each of the rail units includes a cable rack. The cable racks of the rail units are interconnected. A power supply cable is laid through each of the cable racks. The supply cable is fitted with end connectors and a branch connector. The end connectors of the supply cables of adjacent guide rail units interconnect the cables. The branch connectors of the supply cables of the rail units can be connected with branch cables, through which the motors can be supplied with power from the supply cables.

It is possible to lay the power supply cables along the track only by interconnecting these cables via their end connectors when the track is constructed with the guide rail units connected. Because each of the branch connectors is fitted to the supply cable of the associated rail unit, it is possible to connect the motors of the drive units in parallel with each other to the supply cables only by connecting the branch connectors of the supply cables to the branch cables, through which the drive units can be supplied with power. Accordingly, it is possible to easily and efficiently carry out not only the construction of the track and the laying of the supply cables but also the electric connection of the drive units to these cables. Because each of the supply cables is fitted to the cable rack of the associated rail unit, these cables are protected from damage and loss while the rail units are carried to the installation site and installed.

It is preferable that each of the guide rail units be substantially equal in length to the intervals at which the frictional wheels are supported. In this case, it is preferable that each of the guide rail units be fitted with a drive unit, which includes one of the frictional wheels and the associated motor. In the section where drive units need to be fitted at regular intervals, it is possible to construct a track where the drive units are positioned at preset intervals, only by connecting the rail units, to which the drive units are fitted in fixed positions. The rail units are simple in structure because only one branch connector needs to be fitted to the power supply cable of each of the rail units.

Each of the guide rail units may include a pair of rails extending side by side and a plurality of yokes, to which the rails are fixed at both ends and a middle point thereof. The rail units are connected end to end by the yokes at both ends of the rail units. The yokes of each of the rail units support the associated cable rack under the associated rails. One of the yokes of each of the rail units is fitted with the associated drive unit. The use of the yokes, to which the rails are fixed, simplifies and strengthens the rail units, inclusive of the cable racks and drive units.

BRIEF DESCRIPTION OF THE DRAWINGS

FIG. 1A is a side view of a carrier of a friction drive conveyor embodying the present invention.

FIG. 1B is a side view of a guide rail, a drive unit, a control box, etc. of the conveyor.

FIG. 2A is a partially broken top plan of the bar linkages of two carriers in one form of the conveyor.

FIG. 2B is a partially broken side view of the bar linkages shown in FIG. 2A.

FIG. 12A is a partially broken top plan of the bar linkages of two carriers in another form of the conveyor.

FIG. 12B is a partially broken side view of the bar linkages shown in FIG. 12A.

DETAILED DESCRIPTION OF PREFERRED EMBODIMENTS

Figure 3:
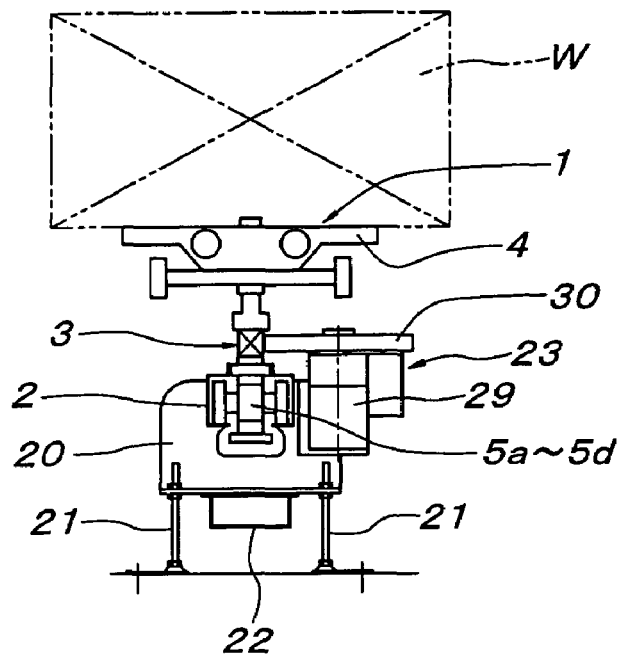
FIG. 3 is a schematic front view in vertical section of a carrier, guide rails, a drive unit, etc. of the conveyor.

With reference to FIGS. 1A, 1B, 2A, 2B and 3, a friction drive conveyor embodying the present invention includes carriers 1, one of which is shown in FIG. 1A. The carriers 1 run in one direction along a pair of opposed-groove guide rails 2, which extend along a track. The track consists of horizontal linear paths and horizontal and vertical curved paths. Each carrier 1 includes a bar linkage 3, a work bed (or deck) 4, a front load trolley 5a, a rear load trolley 5b, a front guide trolley 5c and a rear guide trolley 5d. The bar linkage 3 is parallel to the running direction. The work bed 4 is supported above the bar linkage 3 and supports a work W on it. The trolleys 5a–5d support and guide the bar linkage 3. The front load trolley 5a supports the front end of the work bed 4. The rear load trolley 5b supports the rear end of the work bed 4.

The bar linkage 3 includes a front load bar 7, a middle load bar 6 and a rear load bar 8, each of which consists essentially of a front part, a middle part and a rear part. The bar linkage 3 also includes four vertical-axis joints 9a, 9b, 11b and 12b and four horizontal-axis joints 10a, 10b, 11a and 12a, which enable it to run along the horizontal and vertical curved paths. The vertical-axis joint 9a connects the front part of the middle load bar 6 and the rear part of the front load bar 7. The vertical-axis joint 9b connects the rear part of the middle load bar 6 and the front part of the rear load bar 8. The horizontal-axis joint 10a connects the front and middle parts of the middle load bar 6. The horizontal-axis joint 10b connects the middle and rear parts of the middle load bar 6. The horizontal-axis joint 11a connects the middle and rear parts of the front load bar 7. The vertical-axis joint 11b connects the middle and front parts of the front load bar 7. The horizontal-axis joint 12a connects the front and middle parts of the rear load bar 8. The vertical-axis joint 12b connects the middle and rear parts of the rear load bar 8.

The front part of the front load bar 7 includes a forward protrusion 13 protruding from a lower portion of its front end. The rear part of the rear load bar 8 includes a backward protrusion 14 protruding from an upper portion of its rear end. When any two adjacent carriers 1 get closest to each other, as shown in FIGS. 2A and 2B, the forward protrusion 13 of the succeeding carrier 1 is positioned under the backward protrusion 14 of the preceding carrier 1, so that the bar linkages 3 of these carriage are in end-to-end contact with each other.

The front end 13a of the forward protrusion 13 and the rear end 14a of the backward protrusion 14 are tapered roughly in the shape of the letter V in a plan view, but they might be arcuate or take the form of a bow in a plan view. The side surfaces of the load bars 6–8 are frictional surfaces 15, except for the tapered ends 13a and 14a of the protrusions. The frictional surfaces 15 are parallel to the running direction in the linear paths in a plan view and have a length L. When any two adjacent bar linkages 3 are in end-to-end contact with each other, as shown in FIGS. 2A and 2B, the most backward frictional surfaces 15 of the preceding linkage overlap with the most forward frictional surfaces 15 of the succeeding linkage by a distance "d" in the running direction.

The load trolleys 5a and 5b are independent of the bar linkage 3 and support its vertical-axis joints 9a and 9b, respectively. Each load trolley 5a or 5b includes a front pair of supporting horizontal-axis wheels 16, a rear pair of supporting horizontal-axis wheels 16, a front antivibration vertical-axis roller 17 and a rear antivibration vertical-axis roller 17. The front guide trolley 5c includes a pair of supporting horizontal-axis wheels 18, a front antivibration vertical-axis roller 19 and a rear antivibration vertical-axis roller 19, which are supported by the front part of the front load bar 7. The rear guide trolley 5d includes a pair of supporting horizontal-axis wheels 18, a front antivibration vertical-axis roller 19 and a rear antivibration vertical-axis roller 19, which are supported by the rear part of the rear load bar 8.

As shown in FIGS. 1A, 1B and 3, the guide rails 2 support and guide the horizontal-axis wheels 16 and 18. The vertical-axis rollers 17 and 19 are positioned between the guide rails 2. The guide rails 2 are fixed to a number of yokes 20, which are supported at intervals and at a preset height over a floor by pairs of vertically adjusting bolts 21. The yokes 20 support a cable rack 22, which extends under the whole length of the guide rails 2. Each of some yokes 20 supports a drive unit 23 on its left side. The left guide rail 2 supports control boxes 24 on its outer side, each of which is adjacent to one drive unit 23.

Figure 4:
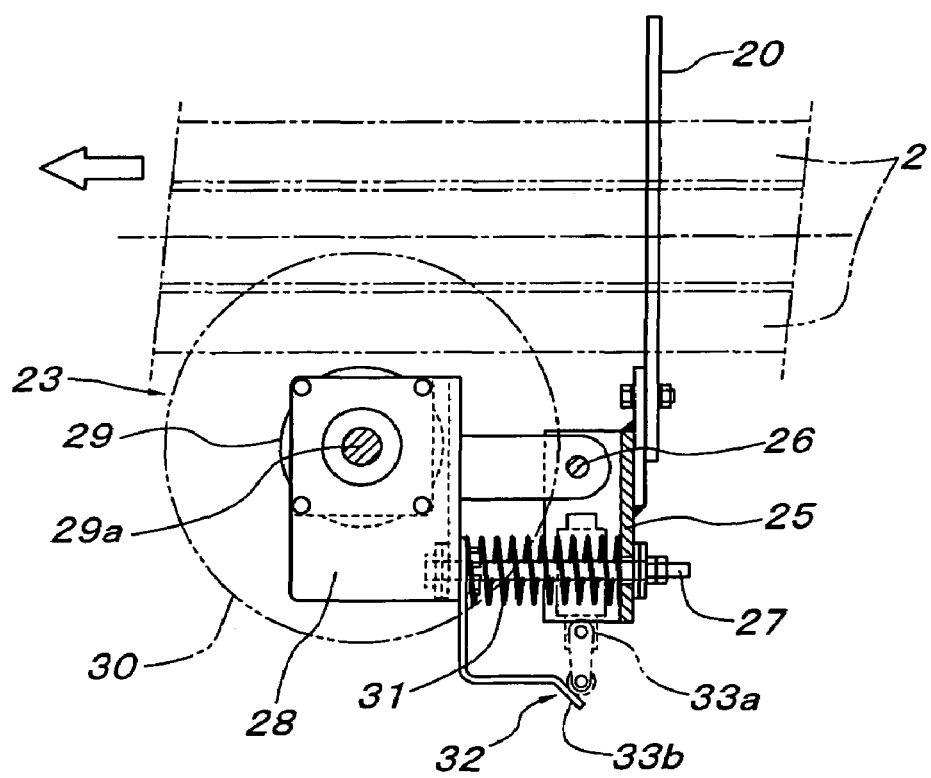
FIG. 4 is a top plan partially in horizontal section of a drive unit etc. of the conveyor.
Figure 5:
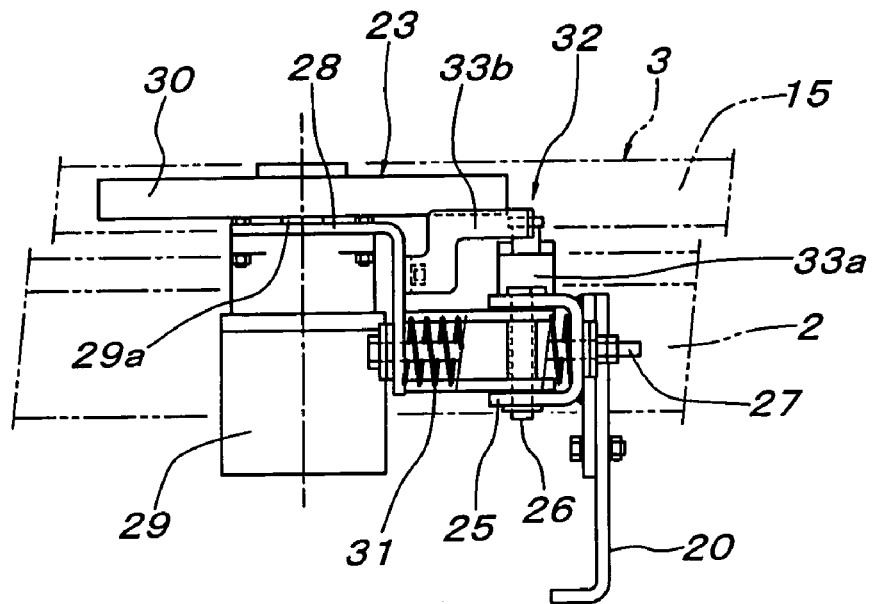
FIG. 5 is a side view of the drive unit etc. shown in FIG. 4.
Figure 6:
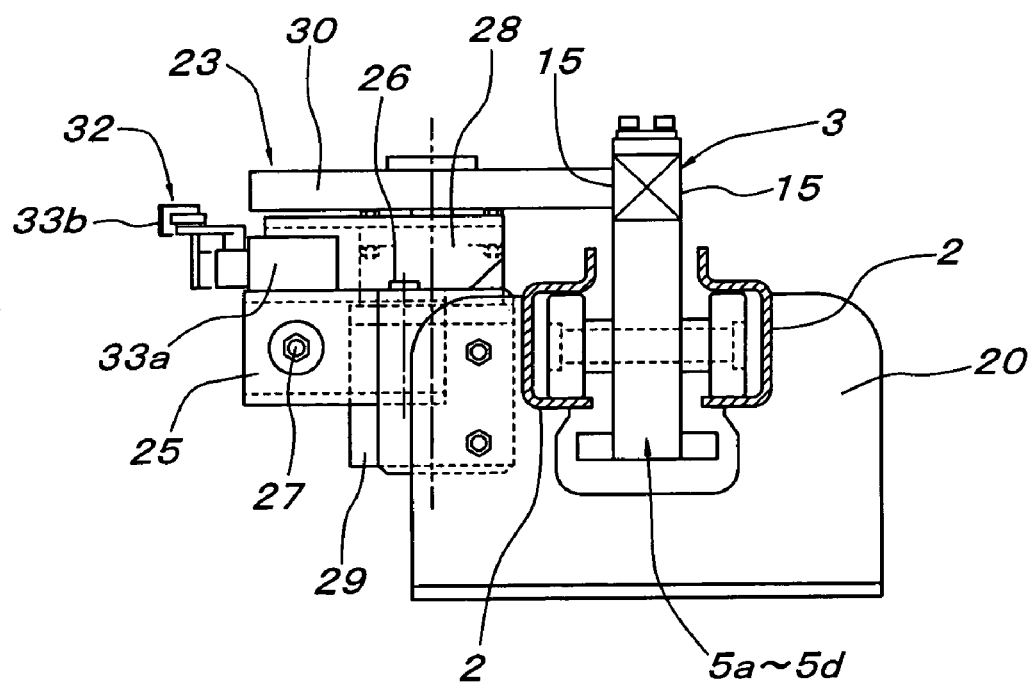
FIG. 6 is a rear view partially in vertical section of the drive unit etc. shown in FIGS. 4 and 5, guide rails of the conveyor and a bar linkage of the conveyor.

As shown in FIGS. 4–6, each drive unit 23 includes a bracket 25, a pivot support 28, a brakeless motor 29, a vertical-axis frictional wheel 30 and a load bar sensor 32. The bracket 25 is fixed to the associated yoke 20 and supports a vertical pivot shaft 26. The pivot shaft 26 supports the pivot support 28, which pivots horizontally on it. The pivotal movement of the pivot support 28 is limited by a horizontal limit bolt 27. The brakeless motor 29 is fixed to the pivot support 28 and fitted with a speed reducer. The brakeless motor 29 has a vertical output shaft 29a extending upward, to which the frictional wheel 30 is fixed. The frictional wheel 30 is biased toward the track by a compression spring 31, which is fitted around the limit bolt 27 between the bracket 25 and pivot support 28. The bar sensor 32 consists of a limit switch 33a and a switch pusher 33b. The limit switch 33a is fitted on the bracket 25. The switch pusher 33b is fixed to the pivot support 28.

When the front load bar 7 of any one carrier 1 comes into contact with the frictional wheel 30 of any one drive unit 23, the front tapered end 13a of this bar moves the wheel 30 outward against the bias force of the associated spring 31. Subsequently, the bias force brings the frictional wheel 30 into compressive contact with the left frictional surface 15 of the front part of the front load bar 7. The compressive contact is sensed by the associated bar sensor 32.

Because of the structure of the bar linkages 3, the carriers 1 can run even along the horizontal and vertical curved paths. When the carriers 1 run along the horizontal curved paths, the bar linkages 3 bend horizontally at their vertical-axis joints 9a, 9b, 11b and 12b. Therefore, it is required that the frictional wheels 30 of the drive units 23 fitted in the horizontal curved paths be able to shift in a wide range with respect to the track. It is also required that these frictional wheels 30 be able to exert roughly constant pressure on frictional surfaces 15.

Figure 7A:
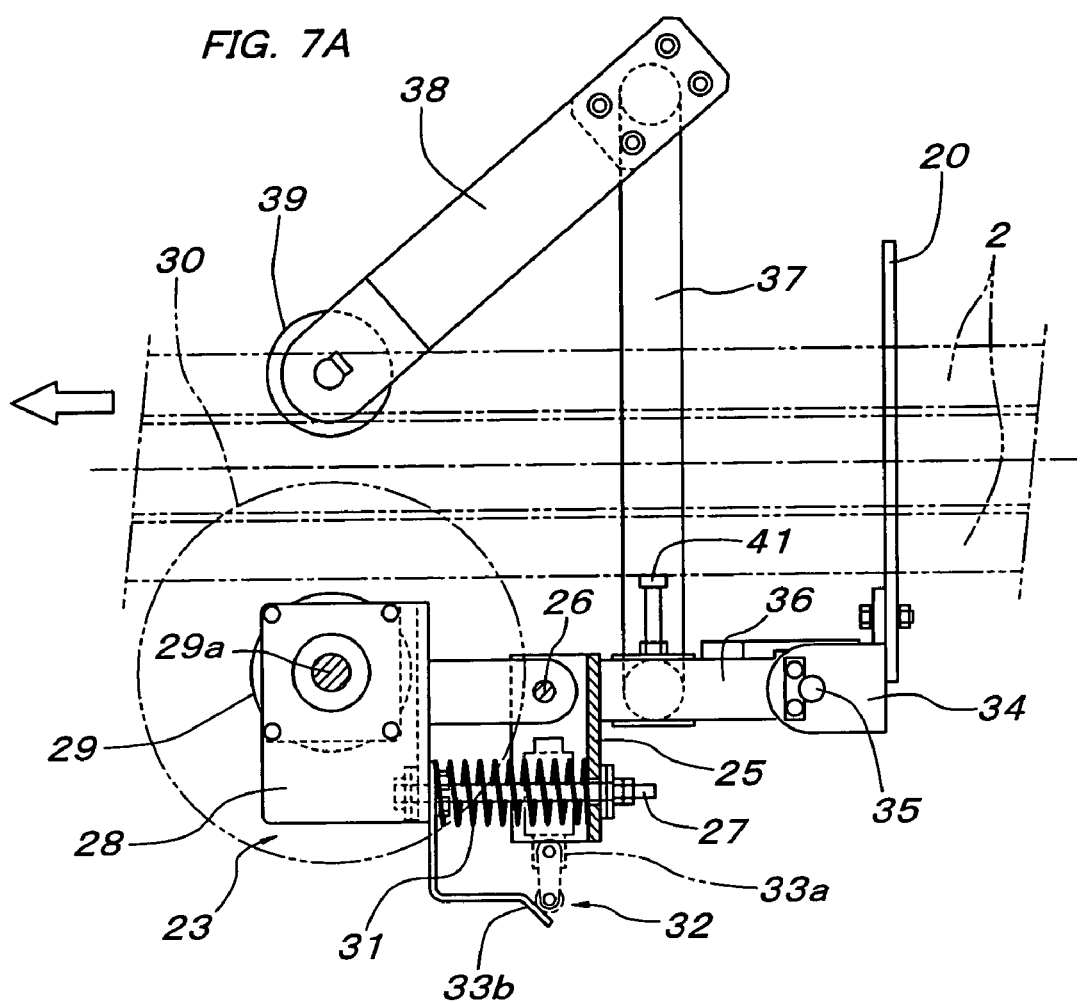
FIG. 7A is a top plan partially in horizontal section of another drive unit etc. of the conveyor.
Figure 7B:
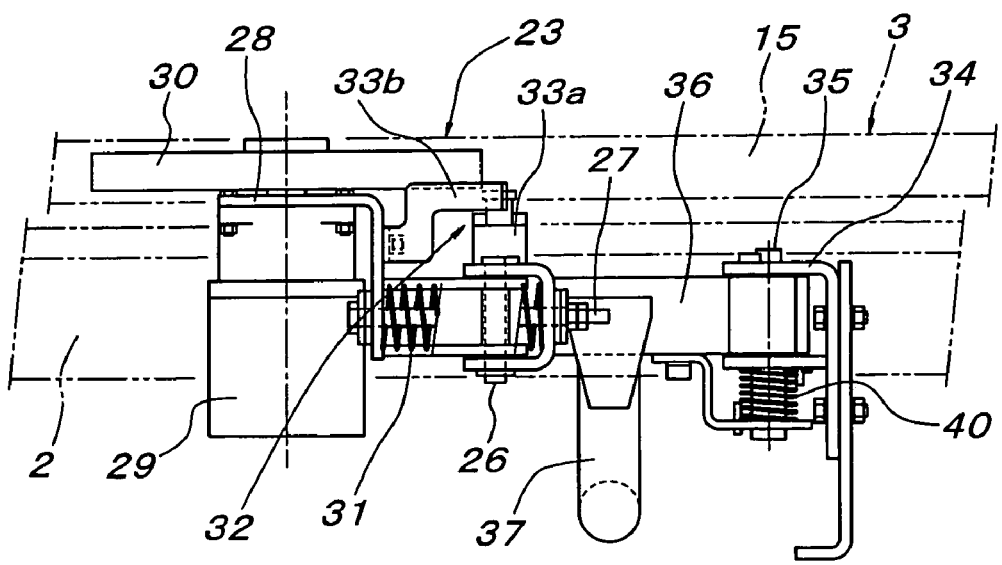
FIG. 7B is a side view of the drive unit etc. shown in FIG. 7A.
Figure 8:
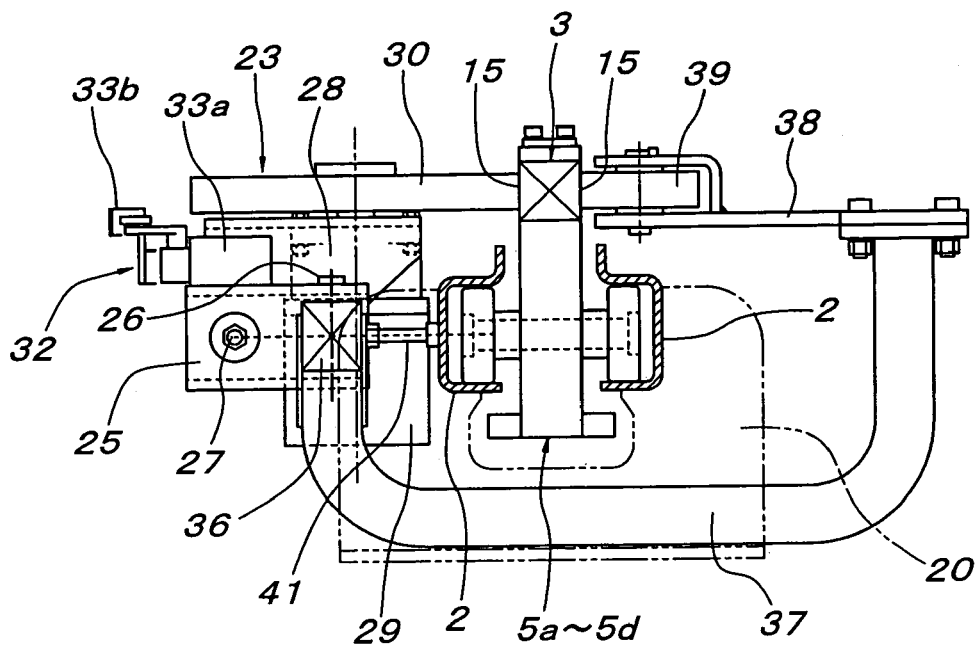
FIG. 8 is a rear view partially in vertical section of the drive unit shown in FIGS. 7A and 7B, guide rails of the conveyor and a bar linkage of the conveyor.

FIGS. 7A, 7B and 8 show one of the drive units 23 in the horizontal curved paths. The bracket 25 of this drive unit 23 is fixed to a horizontal pivot arm 36, which pivots on a vertical pivot shaft 35. The pivot shaft 35 is supported by another bracket 34, which is fixed to the associated yoke 20. One end of a U-shaped arm 37 is fixed to the pivot arm 36. The U-shaped arm 37 extends under the guide rails 2 and rises on their opposite side. One end of a horizontal bearing arm 38 is fixed to the other end of the U-shaped arm 37. The bearing arm 38 extends toward the track. The other end of the bearing arm 38 supports a vertical-axis back-up roller 39. The back-up roller 39 and the associated frictional wheel 30 cooperate to be in compressive contact with the bar linkages 3. The back-up roller 39 is biased away from the track by a torsion spring 40, which is fitted around the pivot shaft 35 between the pivot arm 36 and bracket 34. The pivot arm 36 is fitted with a stopper bolt 41, the head of which can come into contact with the outer side of the left guide rail 2 to position the back-up roller 39 adjacently to the track.

Each drive unit 23 in the horizontal curved paths is so fitted that its frictional wheel 30 is positioned on the side of the associated path where the center of curvature of the path resides. When the bar linkage 3 of any one carrier 1 comes to the position between the frictional wheel 30 and back-up roller 39 of any one of these drive units 23, the bias force of the associated compression spring 31 brings the wheel 30 into compressive contact with the adjacent frictional surface 15 of the linkage. While the carrier 1 is running along the horizontal curved path, the bar linkage 3 bends horizontally and is positioned substantially on the side of the path where the center of curvature of the path resides. The load bar 6, 7 or 8 of the bending bar linkage 3 that is in contact with the frictional wheel 30 forces the wheel 30, the associated pivot support 28, bracket 25, pivot arm 36, U-shaped arm 37 and bearing arm 38, and the back-up roller 39 to shift together around the associated pivot shaft 35 against the bias force of the associated torsion spring 40 counterclockwise in FIG. 7A. This moves the associated stopper bolt 41 away from the guide rails 2. The bias force of the torsion spring 40 is sufficiently small. However, because the frictional wheel 30 and back-up roller 39 are in contact with the frictional surfaces 15 of the load bar 6, 7 or 8 on opposite sides, the bias force of the compression spring 31 can bring the frictional wheel 30 into contact with the adjacent frictional surface 15 with expected pressure.

Figure 10:
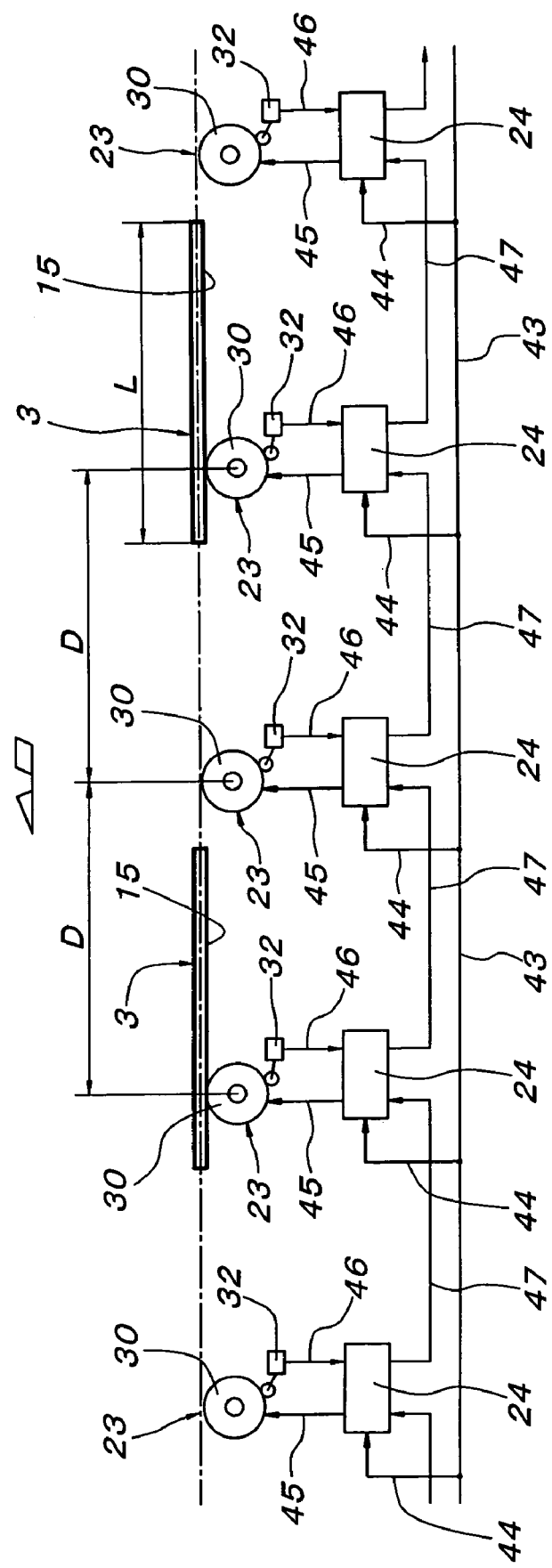
FIG. 10 is a diagram showing the relationships among bar linkages and drive units of the conveyor and the wiring relationships among control boxes of the conveyor.

As stated already, the drive units 23 are supported by yokes 20. As shown in FIG. 10, frictional wheels 30 are spaced at regular intervals D, which are equal to or shorter than the total length L of the frictional surfaces 15 on each side of each bar linkage 3. Specifically, the wheel intervals D are shorter than the total surface length L by the overlapping distance "d" (FIGS. 2A and 2B). As stated already with reference to FIGS. 2A and 2B, when any two adjacent bar linkages 3 are in end-to-end contact with each other, the most backward frictional surfaces 15 of the preceding linkage overlap with the most forward frictional surfaces 15 of the succeeding linkage by the distance "d" in the running direction. In other words, the yokes 20 are so positioned that the drive units 23 are spaced at intervals D (D=L−d). The yokes 20 can be positioned at intervals sufficiently shorter than the wheel intervals D.

Figure 9:
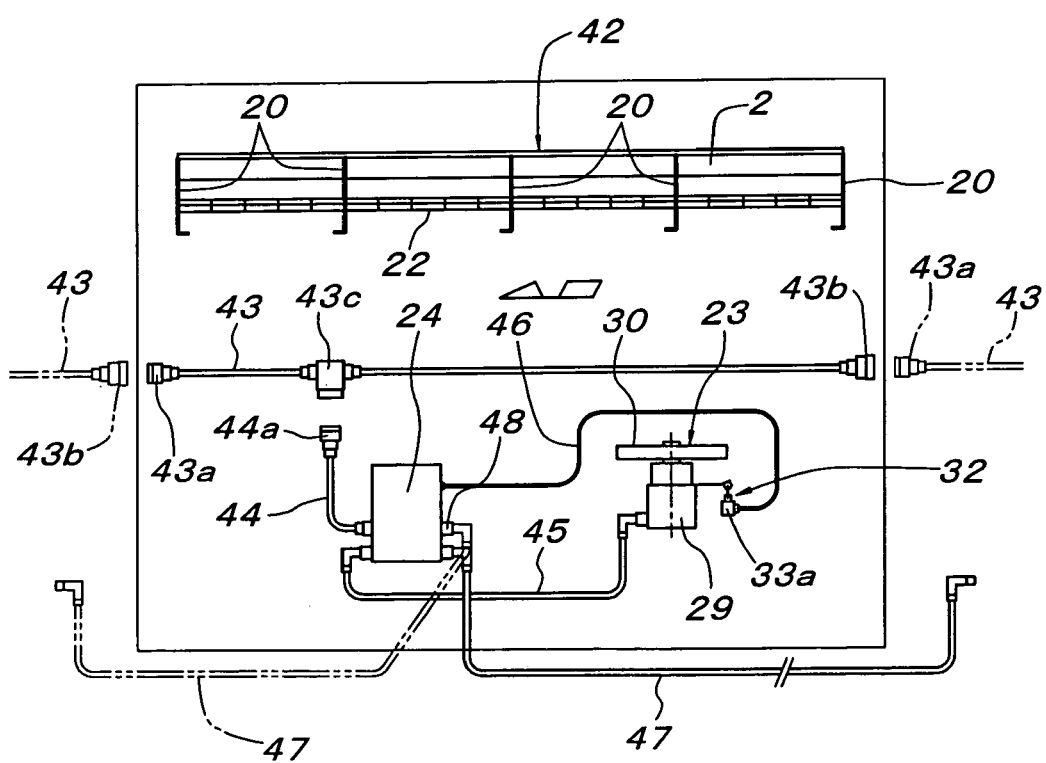
FIG. 9 shows a guide rail unit, a drive unit, a control box and cables of the conveyor.

With reference to FIG. 9, the track may consist of guide rail units 42, one of which is shown, and each of which is roughly equal in length to the wheel intervals D. Each guide rail unit 42 includes guide rails 2, which are supported by yokes 20. The guide rail units 42 are connected together by the yokes 20 at the ends of the guide rails 2. Each guide rail unit 42 is fitted with one drive unit 23 and one control box 24. The cable rack 22 supported by the yokes 20 of each guide rail unit 42 is fitted with a power supply cable 43, which is roughly equal in length to the rail unit 42. One end of the power supply cable 43 is fitted with a male connector 43a, and the other end is fitted with a female connector 43b. The power supply cable 43 is fitted with a branch connector 43c between its ends. Thus, the interconnection of the guide rail units 42 by means of the yokes 20 at the ends of the guide rails 2 forms the track. In the meantime, the interconnection of the power supply cables 43 of the guide rail units 42 by means of the end connectors 43a and 43b completes the laying of a power cable extending along the track.

Figure 19:
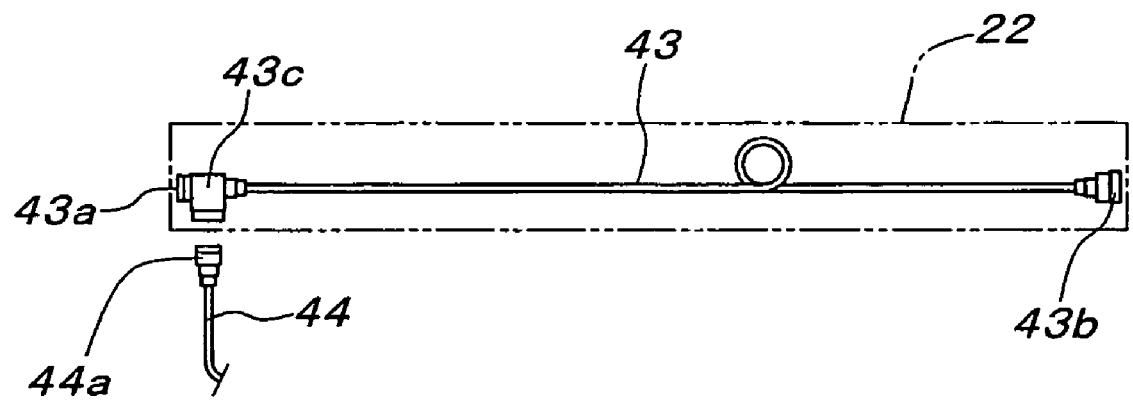
FIG. 19 is a side view of a power supply cable in modified form that can be fitted to a guide rail unit of a friction drive conveyor embodying the present invention.

FIG. 19 shows a modified power supply cable 43, one end of which is fitted with a branch connector 43c. The branch connector 43c and a male connector 43a (or female connector 43b) are combined into one piece. The other end of this supply cable 43 is fitted with a female connector 43b (or male connector 43a).

The drive unit 23 of each guide rail unit 42 is fitted on one of its yokes 20. The control box 24 of each guide rail unit 42 is fitted on the outer side of the associated left guide rail 2 adjacently to the associated drive unit 23. A branch power cable 44, a connecting power cable 45, a signal cable 46 and a control cable 47 are connected to the control box 24 detachably by connectors. The branch power cable 44 is connected by a connector 44a to the branch connector 43c of the power supply cable 43. The connecting power cable 45 is connected to the brakeless motor 29 of the associated drive unit 23. The signal cable 46 is connected to the limit switch 33a of the drive unit 23, the bar sensor 32 of which outputs an on-off signal through this cable to the control box 24. The control box 24 transmits a start signal to the backward next box 24 through the control cable 47. The control box 24 supplies DC power to the control circuit (not shown) of the backward next box 24 through the control cable 47. The control box 24 is fitted with a connector 48 for connecting with the control cable 47 of the forward next box 24.

The guide rail units 42 are connected end to end, and the power supply cables 43 are connected by the end connectors 43a and 43b. The drive units 23 and control boxes 24 are fitted at the appropriate locations. Subsequently, as shown in FIGS. 9 and 10, each control box 24 is connected to the associated power supply cable 43 by the associated branch power cable 44, and to the brakeless motor 29 of the associated drive unit 23 by the associated connecting power cable 45. Consequently, each brakeless motor 29 is connected, in parallel with the other, via the associated control box 24 to the associated power supply cable 43. Each control box 24 is also connected to the limit switch 33a of the associated bar sensor 32 by the associated signal cable 46. Adjacent control boxes 24 are connected by the associated control cables 47. Each cable rack 22 supports the associated cables 44–47 in it, which may be fixed to it.

Figure 11:
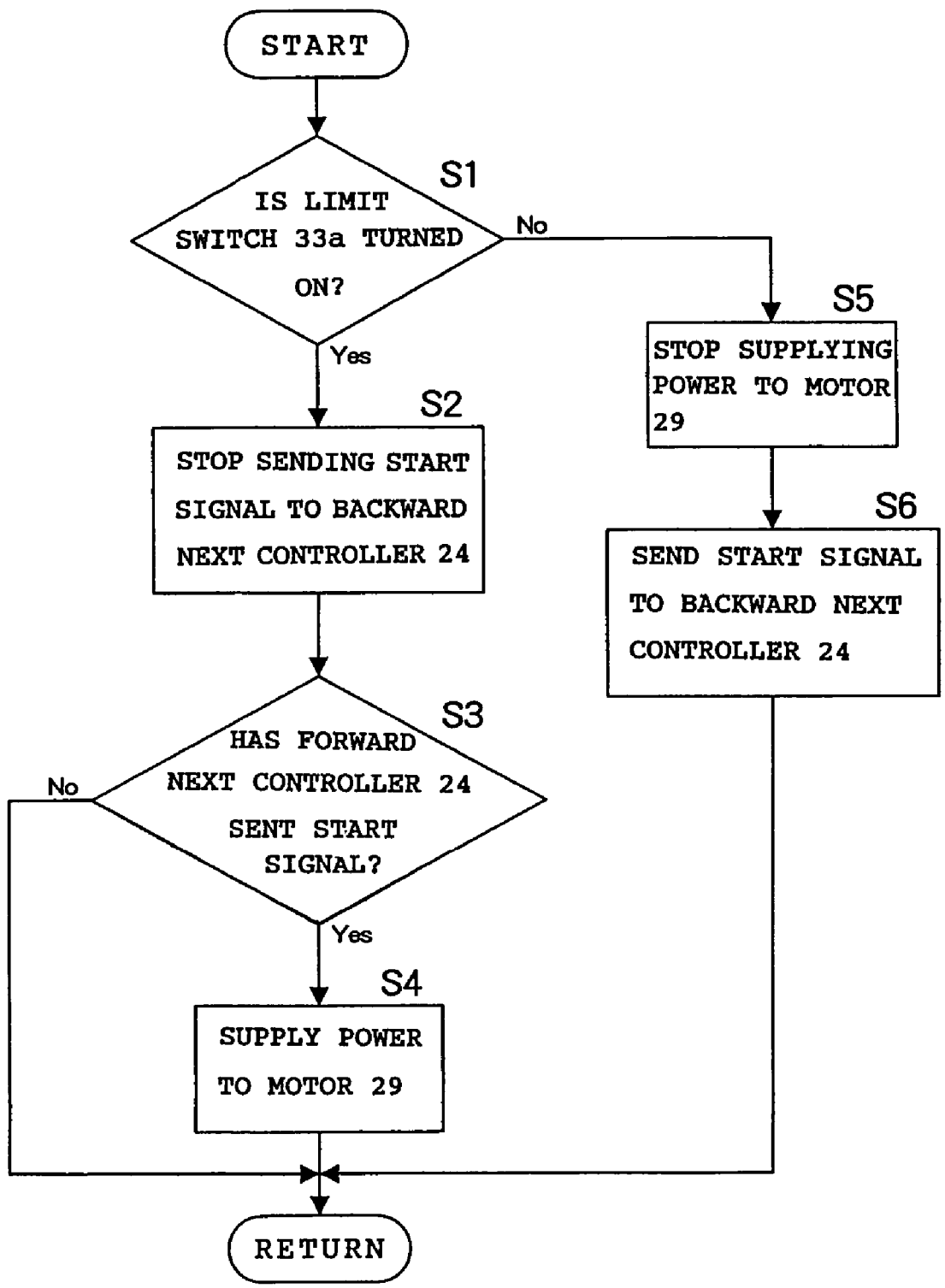
FIG. 11 is a flowchart of the control process performed by each of the control boxes.

Each control box 24 carries out the on-off control of the brakeless motor 29 of the associated drive unit 23 on the basis of the on-off signals from the bar sensors 32 of this drive unit and the forward next drive unit. FIG. 11 is a flowchart of the on-off control of the brakeless motor 29.

The limit switch 33a of any one load bar sensor 32 is on while the associated frictional wheel 30 is in contact with any one frictional surface 15 of the bar linkages 3. The limit switch 33a is off while the frictional wheel 30 is out of contact with the bar linkages 3. Only if the limit switch 33a is off, the associated control box 24 transmits a start signal through the associated control cable 47 to the backward next box 24. If the limit switch 33a is on (S1 in FIG. 11), the associated control box 24 transmits no start signal to the backward next box 24 (S2). If the limit switch 33a is off (S1), the associated control box 24 supplies no power to the associated brakeless motor 29 (S5) and transmits a start signal to the backward next box 24 (S6). If the limit switch 33a is on (S1), and if the forward next control box 24 transmits a start signal (S3), the control box 24 associated with the switch 33a supplies power to the associated brakeless motor 29 (S4).

Thus, if any one bar linkage 3 is present at any one drive unit 23, and if no bar linkage 3 is present at the forward next unit 23, the frictional wheel 30 of the drive unit 23 at which the bar linkage 3 is present drives this linkage forward, and the frictional wheel 30 of the backward next unit 23 is kept stopping until the bar linkage 3 leaves the frictional wheel 30 driving it. Consequently, the forward protrusion 13 of the bar linkage 3 driven by any one frictional wheel 30 comes into contact with the forward next wheel 30 not rotating. As stated already, the wheel intervals D are shorter than the total length L of the frictional surfaces 15 on each side of each bar linkage 3 by the distance "d". Accordingly, when any one frictional wheel 30 drives the rear part of the rear load bar 8 of any one bar linkage 3, the thrust exerted on the linkage 3 by the wheel 30 causes the front tapered end 13a of this linkage to force the forward next wheel 30 outward, which is not rotating. This makes it possible to reliably bring the forward next wheel 30 into compressive contact with the front part of the front load bar 7 of the bar linkage 3, thereby turning on the associated limit switch 33a.

When the front part of the front load bar 7 of any one bar linkage 3 comes into compressive contact with any one frictional wheel 30 while the rear part of the associated rear load bar 8 is in compressive contact with the backward next wheel 30, the control box 24 associated with the wheel 30 in compressive contact with the front load bar 7 stops transmitting the start signal to the control box 24 associated with the wheel 30 in compressive contact with the rear load bar 8. This stops the rotation of the frictional wheel 30 in compressive contact with the rear load bar 8. Even after this frictional wheel 30 stops rotating, the inertia of the associated carrier 1 moves it a short distance forward because the motors 29 for driving the frictional wheels 30 are brakeless. Practically, the short distance may range roughly between 200 and 600 millimeters if the whole length of each bar linkage 3 is about 3,500 millimeters. The overlapping distance "d" (FIGS. 2A and 2B) may be 50 or less millimeters and should preferably be about 20 millimeters. This practically avoids stopping the rotation of two frictional wheels 30 in compressive contact with the front and rear load bars of any one bar linkage 3 at the same time. Consequently, the bar linkage 3 stops with its most backward frictional surfaces 15 forward off the frictional wheel 30 that drove its rear load bar 8.

Thus, the bar linkage 3 driven forward by any one frictional wheel 30 stops with the front part of its front load bar 7 in compressive contact with the forward next wheel 30. When the further forward next frictional wheel 30 gets free of compressive contact with the rear part of the rear load bar 8 of the preceding bar linkage 3, the forward next wheel 30 starts rotating, thereby driving the bar linkage 3 in contact with it. The repetition of this operation propels the bar linkages 3 forward in sequence without each of them colliding with the preceding linkage. The space between any two adjacent carriers 1 may be greater than the wheel intervals D. In this case, as far as the preceding carrier 1 does not stop, the two carriers 1 are driven continuously at a roughly constant speed. There may be a case where one carrier 1 keeps stopping. In this case, on the assumption that the distance for which the inertia of each carrier 1 moves it does not vary greatly, as apparent from the foregoing operation, the succeeding carriers 1 stop in sequence with their bar linkages 3 in end-to-end contact with one another, as shown in FIGS. 2A and 2B. The stopping carriers 1 are in storage with their bar linkages 3 continuous in the running direction.

When carriers 1 are thus in storage with their bar linkages 3 in end-to-end contact with one another, the most forward and most backward frictional surfaces 15 of adjacent ones of these carriers overlap with each other by the distance "d" in the running direction. Consequently, the effective total length of the frictional surfaces 15 on each side of each carrier 1 in storage is shorter than the total length L of these surfaces by the overlapping distance "d" (L–d). The effective total length is equal to the wheel intervals D. In other words, only one frictional wheel 30 is in compressive contact with the bar linkage 3 of each carrier 1 in storage. Although the total surface length L is longer than the wheel intervals D by the overlapping distance "d", two or more frictional wheels 30 cannot be in contact with the frictional surfaces 15 of any one carrier 1 in storage at the same time. Of course, any one frictional wheel 30 may be in contact with the overlapping surfaces of every two adjacent stopping bar linkages 3. In this case, another frictional wheel 30 is necessarily in compressive contact with the front part of the front load bar 7 of the fore stopping linkage 3. Only the frictional wheel 30 in contact with the fore stopping linkage 3 is rotated to move this linkage forward. Accordingly, the fore stopping carrier 1 can be started reliably without being substantially affected by the stopping frictional wheels 30 in contact with the small overlapping surfaces of the stopping bar linkages 3. The counter torque of the brakeless motors 29 is relatively small.

As stated already, when any two adjacent bar linkages 3 are in end-to-end contact with each other, the most backward frictional surfaces 15 of the preceding linkage overlap with the most forward frictional surfaces 15 of the succeeding linkage by the distance "d" in the running direction. FIGS. 12A and 12B show modified bar linkages 3. With reference to FIGS. 12A and 12B, when any two adjacent bar linkages 3 are in end-to-end contact with each other, the backward protrusion 14 of the preceding linkage is positioned over the forward protrusion 13 of the succeeding linkage. When the protrusions 13 and 14 thus overlap with each other, the rear ends of the most backward frictional surfaces 15 of the preceding linkage are aligned with the front ends of the most forward frictional surfaces 15 of the succeeding linkage. In each of the foregoing embodiment and the embodiment shown in FIGS. 12A and 12B, the wheel intervals D might be roughly equal to the total length L of the frictional surfaces 15 on each side of each bar linkage 3.

Normally, after any one frictional wheel 30 stops driving any one carrier 1, the inertia of the carrier 1 moves it to a certain extent until it actually stops. While the conveyor according to the embodiment shown in FIGS. 12A and 12B is in practical operation, two adjacent frictional wheels 30 may not stop at the same time in contact with the frictional surfaces 15 of any one bar linkage 3. In this case, the wheel intervals D may be shorter than the total length L of the frictional surfaces 15 on each side of each bar linkage 3. Even in this case, the motors 29 for driving the frictional wheels 30 may be brakeless motors having small counter torque, so that the rotation of the forward frictional wheel 30 may practically make the stopping backward wheel 30 easily idle, and the backward wheel 30 may not substantially affect the delivery of the bar linkage 3. In the latter case as well, the wheel intervals D may be shorter than the total surface length L.

Figure 13:
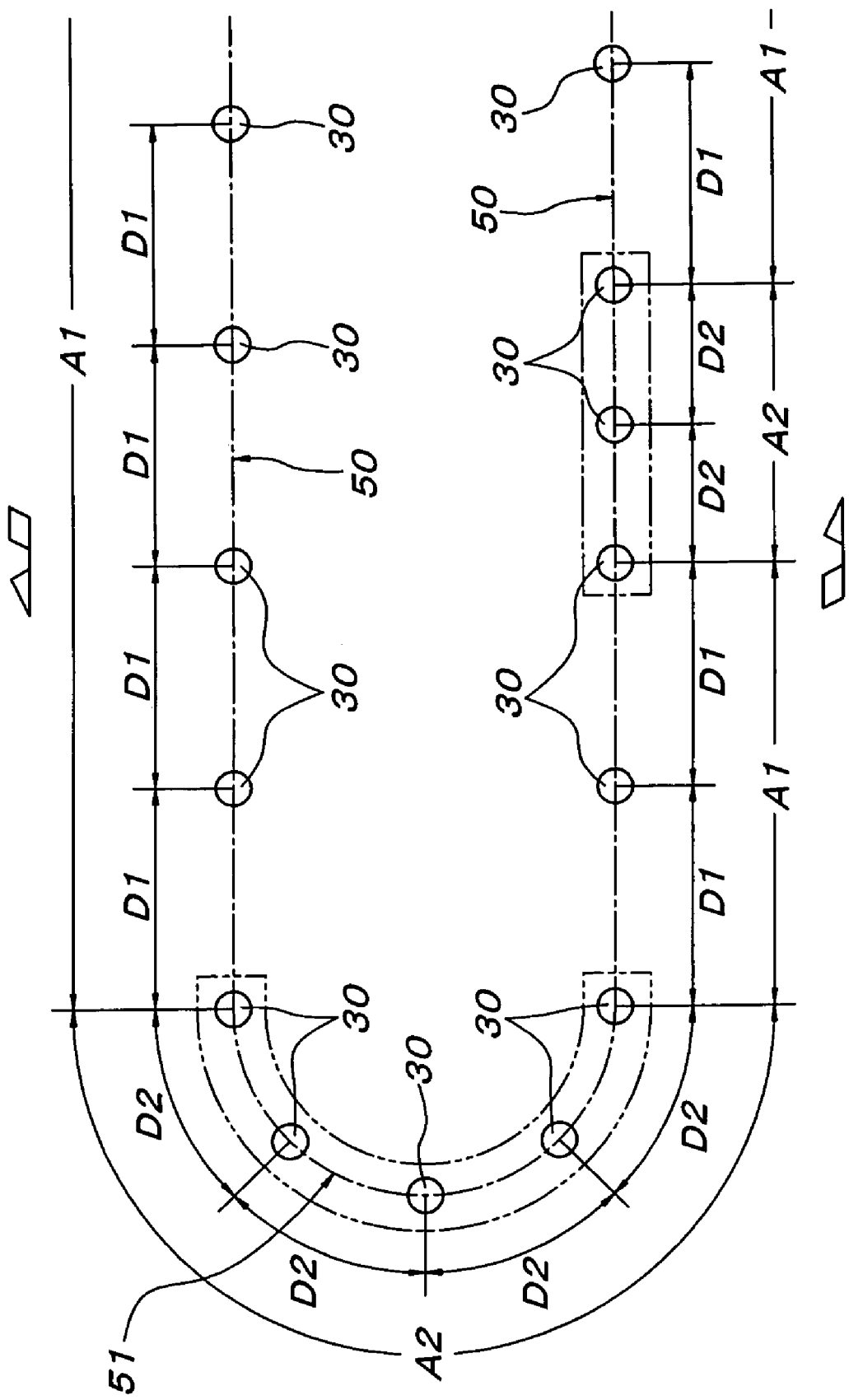
FIG. 13 is a schematic top plan of part of the track for a friction drive conveyor according to a second embodiment of the present invention.
Figure 14:
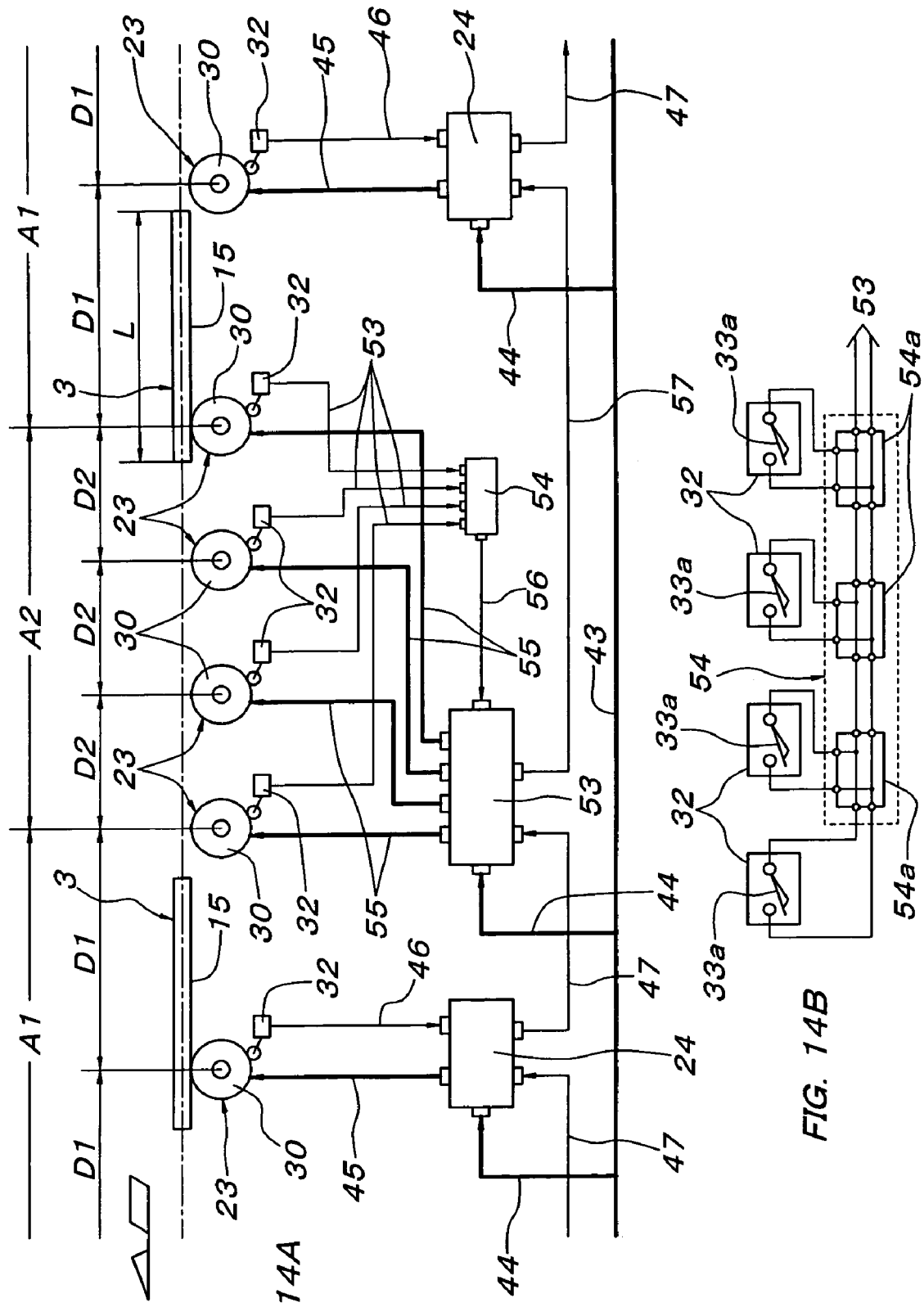
FIG. 14A is a diagram showing the configuration of a second section of the track.
FIG. 14B is a practical electric circuit diagram of part of the configuration shown FIG. 14A.
Figure 15:
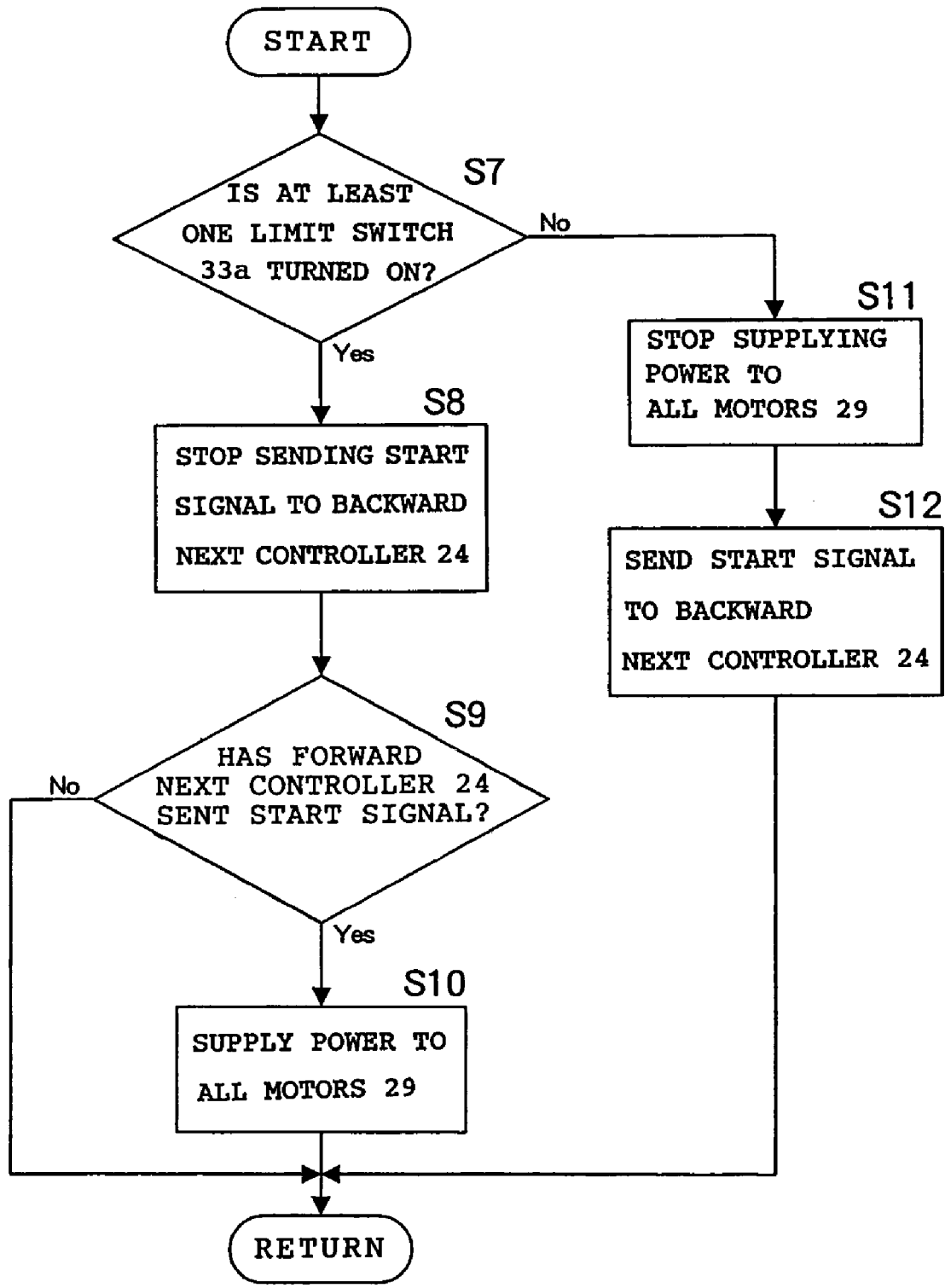
FIG. 15 is a flowchart of the control process performed by the control box for each second section of the track.

All frictional wheels 30 do not need to be spaced at regular intervals D along the part of the track where the drive units 23 are fitted. The length of this track part or the whole length of the track may not be an integral number of times the wheel intervals D. Drive units 23 may be fitted on yokes 20 spaced at shorter intervals along the horizontal curved paths and other parts of the track. In these cases, some frictional wheels 30 are spaced at shorter intervals than the other frictional wheels. FIGS. 13–15 show a second preferred embodiment of the present invention, which is suitable for such cases.

With reference to FIG. 13, carriers 1 run along a track, which consists of guide rails 2 and includes linear paths 50 and a horizontal curved path 51. One linear path 50 includes a first section A1. Another linear path 50 includes first sections A1 and a second section A2. The horizontal curved path 51 is a second section A2. Along the first path sections A1, frictional wheels 30 are spaced at regular intervals D1. Along the second path sections A2, frictional wheels 30 are spaced at intervals D2, which are shorter than the regular intervals D1, and all of which do not need to be regular.

The first path sections A1 are identical in structure with the linear paths of the first embodiment. The wheel intervals D1 are equal to the wheel intervals D of the first embodiment. When any two adjacent bar linkages 3 are in end-to-end contact with each other, as shown in FIGS. 2A and 2B, the most backward frictional surfaces 15 of the preceding linkage overlap with the most forward frictional surfaces 15 of the succeeding linkage by the distance "d" in the running direction. The wheel intervals D1 are shorter than the total length L of the frictional surfaces 15 on each side of each bar linkage 3 by the overlapping distance "d".

It is preferable that the drive units 23 fitted in the horizontal curved path 51 include back-up rollers 39 as shown in FIGS. 7A, 7B and 8. A second section A2 is included in the linear path 50 along which all frictional wheels 30 cannot be spaced at regular intervals D1 because the length of this path 50 is not an integral number of times the intervals D1, or because of a working station, where carriers 1 stop, or of other equipment or installation.

As shown in FIGS. 14A and 14B, each second path section A2 is provided with a control box 53 and an OR circuit box 54. The control box 53 controls all drive units 23 in the associated path section A2. The OR circuit box 54 is connected to the limit switches 33a of the bar sensors 32 of the drive units 23 in the path section A2 by connecting cables 53. The control box 53 is connected to the power supply cable 43 by a branch power cable 44. Connecting power cables 55, a signal cable 56 and two control cables 57 and 47 are connected to the control box 53 detachably via connectors. Each connecting power cable 55 is connected to the motor 29 of one drive unit 23 in the path section A2. The signal cable 56 is connected to the OR circuit box 54, which outputs a load bar sensor on-off OR signal to the control box 53. The control box 53 transmits a start signal through the control cable 57 to the control box 24 for the backward next path section A1. The control box 53 supplies DC power through this control cable 57 to the control circuit (not shown) of this control box 24. The control cable 47 is connected to the control box 24 for the forward next path section A1. If the cables connected to the control box 53 are sufficiently long, they are supported in a cable rack 22 and may be fixed to it. As shown in FIG. 14B, the OR circuit box 54 may practically include commercial connectors 54a for parallel connection, which connect the limit switches 33a in parallel.

The control box 24 provided for each drive unit 23 in the first sections A1 of the linear paths 50 is identical with the control boxes 24 of the first embodiment and operates as described earlier with reference to the flowchart shown in FIG. 8. Accordingly, no description will be provided of the running control of the carriers 1 in the first path sections A1.

FIG. 15 is a flowchart of the operation of the control circuits of the control boxes 53 for the second sections A2 of one linear path 50 and the horizontal curved path 51. If the frictional wheel 30 of at least one drive unit 23 of any one second path section A2 is in compressive contact with any one frictional surface 15 of any one carrier 1, the associated limit switch 33a is on (S7 in FIG. 15). In this case, on the basis of the load bar sensor on-off OR signal input from the associated OR circuit box 54 through the associated signal cable 56 into the associated control box 53, this control box transmits no start signal to the control box 24 for the backward next path section A1 (S8). If no frictional wheels 30 in the second path section A2 are in compressive contact with the frictional surfaces 15 of any carriers 1, all the associated limit switches 33a are off (S7). In this case, on the basis of the load bar sensor on-off OR signal from the OR circuit box 54, the control box 53 supplies no power to any motors 29 in the second path section A2 (S11) and transmits a start signal to the control box 24 for the backward next path section A1 (S12).

If the limit switch 33a of at least one drive unit 23 in the second path section A2 is on (S7), and if the control box 24 for the forward next path section A1 transmits a start signal to the control box 53 for the second path section A2 (S9), this control box 53 supplies power to all motors 29 in the second path section A2 (S10).

As obvious from the foregoing control, if no carriers 1 are present in the second path section A2, the most forward drive unit 23 in the backward next path section A1 delivers one carrier 1 to the second path section A2. When the front end of the bar linkage 3 of the delivered carrier 1 reaches the most backward frictional wheel 30 in the second path section A2, the carrier 1 stops. Subsequently, when the most backward frictional wheel 30 in the forward next path section A1 gets free of compressive contact with the preceding bar linkage 3, all frictional wheels 30 in the second path section A2 are driven. Consequently, the carrier 1 stopping at the rear end of the second path section A2 is moved forward through this section until it reaches the most backward frictional wheel 30 of the forward next path section A1. This empties the second path section A2, so that the succeeding carrier 1 can enter this section. Thus, the control box 53 for each second path section A2 controls all the associated drive units 23 in a batch by regarding them as the single drive unit 23 of each first path section A1.

If the drive units 23 of any one second path section A2 are large in number, they might be so controlled that, when the carrier 1 stopping at the rear end of this section A2 is moved forward through the section, the associated control box 53 would start rotating only the frictional wheel or wheels 30 associated with the limit switch or switches 33a turned on by this carrier 1 and stop rotating the wheel or wheels 30 associated with the switch or switches 33a turned off by the carrier 1. This reduces the operation time of the associated motors 29 and the running cost of the conveyor.

Any bar linkage 3 present in each second path section A2 is sensed by the bar sensors 32 provided for the respective frictional wheels 30 in this section A2. Alternatively, any bar linkage 3 in each second path section A2 might be sensed by any other sensor that could continuously sense the linkage 3 after its front load bar 7 comes into compressive contact with the most backward frictional wheel 30 in this section A2 and until its rear load bar 8 gets free of compressive contact with the most forward frictional wheel 30 in the section. The OR circuit box 54 connected to the control box 53 for each second path section A2 might form part of this control box and be incorporated into its control circuit.

Figure 16A:
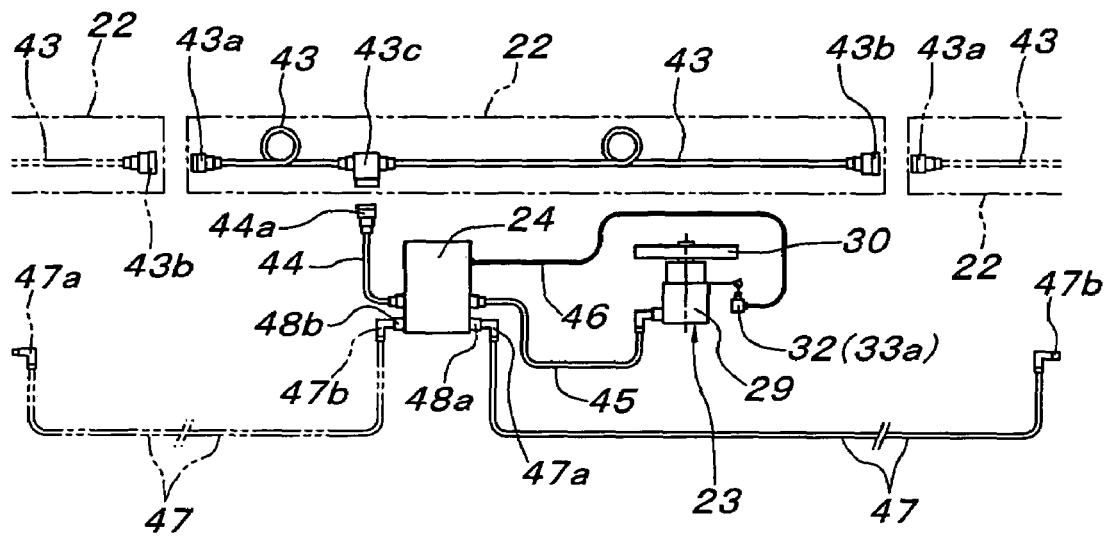
FIG. 16A shows a control box in normal condition of a friction drive conveyor according to a third embodiment of the present invention and the wiring of the box.
Figure 16B:
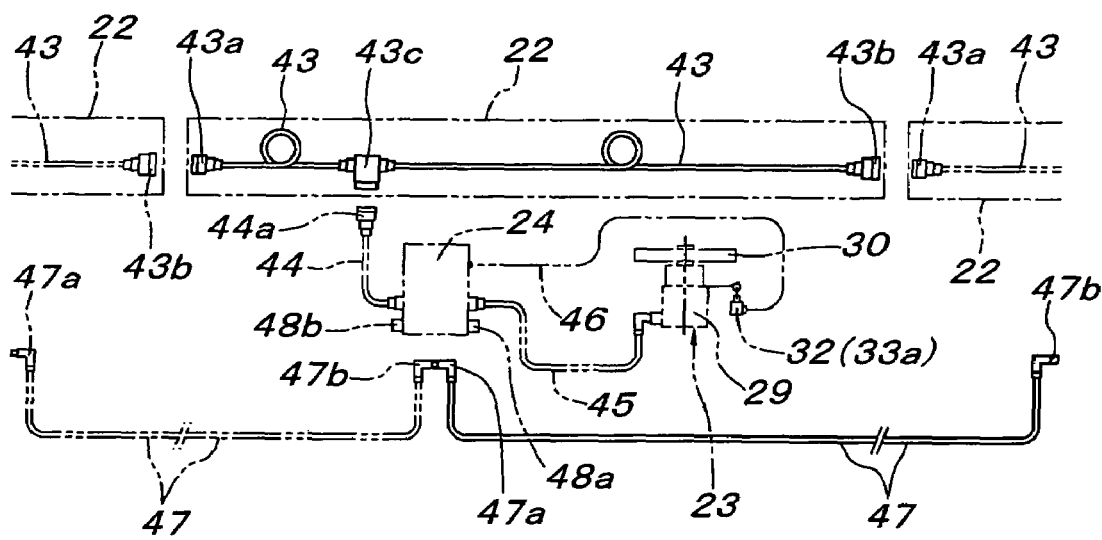
FIG. 16B shows a control box in abnormal condition of the conveyor according to the third embodiment and the wiring of the box.

FIGS. 16A, 16B, 17 and 18 show a friction drive conveyor according to a third preferred embodiment of the present invention. This embodiment does not differ from the foregoing embodiments in the structure of the drive units 23, the arrangement of them along the track, the control of them, etc., but differs in the wiring relationships of the drive units 23 to the control boxes 24. As shown in FIG. 16A, which is similar to FIG. 9 of the first embodiment, each control box 24 transmits a start signal to the backward next box 24 and supplies DC power to the control circuit (not shown) of the next box through a control cable 47. This cable 47 is fitted with a male plug 47a at one end and a female plug 47b at the other end. Each control box 24 is fitted with a female connector 48a for connecting with the male plug 47a of the control cable 47 connected to the backward next box 24 and a male connector 48b for connecting with the female plug 47b of the control cable 47 connected to the forward next box 24. As shown in FIG. 16B, the male plug 47a and female plug 47b connected to each control box 24 can be disconnected from it and connected directly to each other.

Any drive unit 23 may, due to failure or the like, get unable to sufficiently drive the carriers 1. In this case, as shown with two-dot chain lines in FIGS. 16B and 17, the two control cables 47 connected to the control box 24 for the drive unit 23 may be disconnected from this box. Subsequently, the drive unit 23 and control box 24 may be removed from the associated yoke 20 and guide rail 2, respectively. The disconnected cables 47 may be connected directly to each other by means of their free plugs 47a and 47b.

Figure 17:
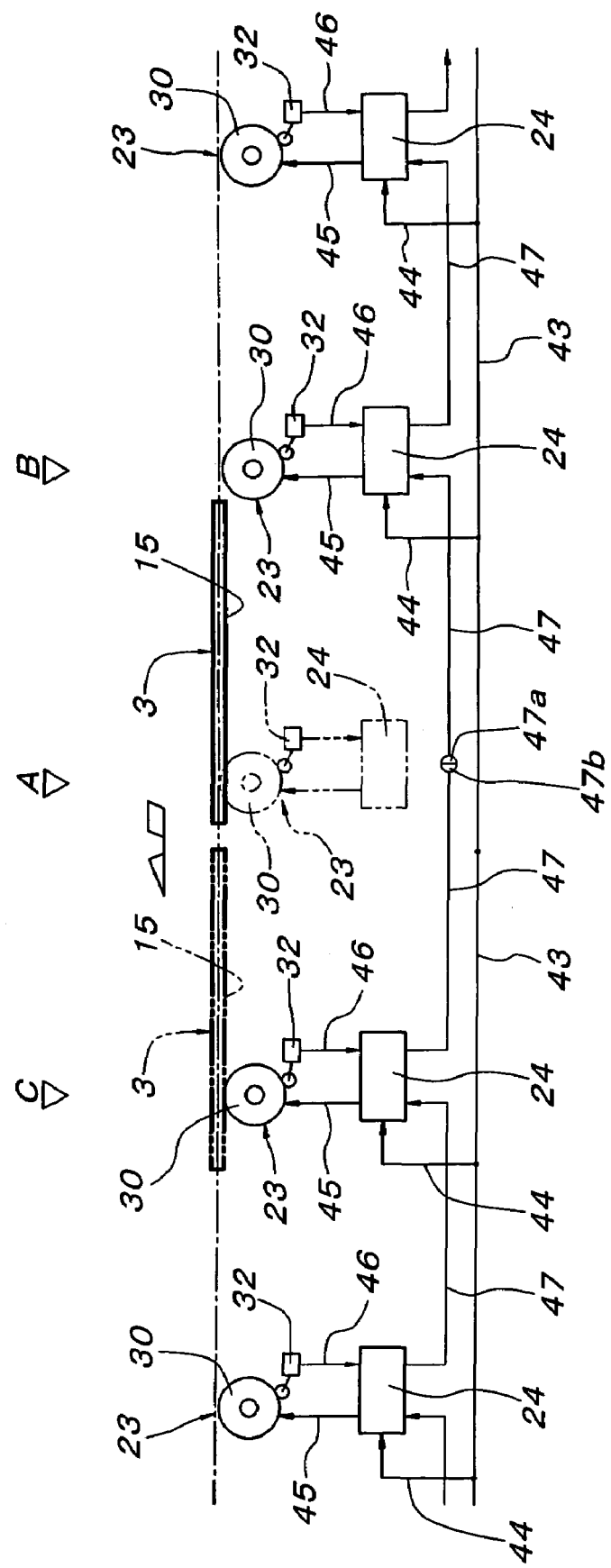
FIG. 17 is a diagram showing control boxes, one of which is in abnormal condition, of the conveyor according to the third embodiment and the wiring of the boxes.

Consequently, as shown in FIG. 17, the control box 24 (position C) forward next to the removed box (position A) transmits a start signal to the control box 24 (position B) backward next to the removed box through the directly connected control cables 47 on the basis of the on-off signal from the bar sensor 32 associated with the forward next box 24 (position C). The drive unit 23 and control box 24 (position B) backward next to the removed unit and box (position A) are spaced from the drive unit 23 and control box 24 (position C) forward next to the removed unit and box, respectively, with an interval twice the regular intervals D. In this situation, the control according to the flowchart shown in FIG. 11 is carried out.

With reference to FIG. 17, there may be a case where one carrier 1 stops with the front part of its front load bar 7 in compressive contact with the frictional wheel 30 in the position B. In this case, if the frictional wheel 30 in the position C is free, the frictional wheel 30 in the position B drives the carrier 1 forward. The carrier 1 stops soon after it leaves the frictional wheel 30 in the position B. The carrier 1 stopping between the positions B and C may be moved forward by hand until the front part of its front load bar 7 comes into compressive contact with the frictional wheel 30 in the position C. Alternatively, the carrier 1 may be kept stopping between the positions B and C. In this case, until the limit switch 33a in the position C is turned on, the succeeding carrier 1 moved to the position B is moved toward the position C, as stated already. As a result, the succeeding carrier 1 pushes the carrier 1 stopping between the positions B and C, moving it to the position C. When the carrier 1 between the positions B and C reaches the position C, the limit switch 33a in this position is turned on. Consequently, the control box 24 in the position C stops transmitting the start signal to the control box 24 in the position B. In the meantime, the carrier 1 stopping in the position C is driven further forward. Until the frictional wheel 30 in the position C gets free of compressive contact with the rear load bar 8 of the carrier 1, the frictional wheel 30 in the position B is not activated. Accordingly, while any one carrier 1 is present in the position C, no other carrier 1 is conveyed forward from the position B.

If the removed drive unit 23 and control box 24 have been repaired and restored to their normal conditions, they are returned to the original position A. In the meantime, the two control cables 47 connected directly with each other by plugs 47a and 47b are disconnected from each other. Subsequently, the disconnected cables 47 are connected to the connectors 48a and 48b of the returned box 24. This makes it possible to carry out the expected or intended control according to the flowchart shown in FIG. 11.

Figure 18:
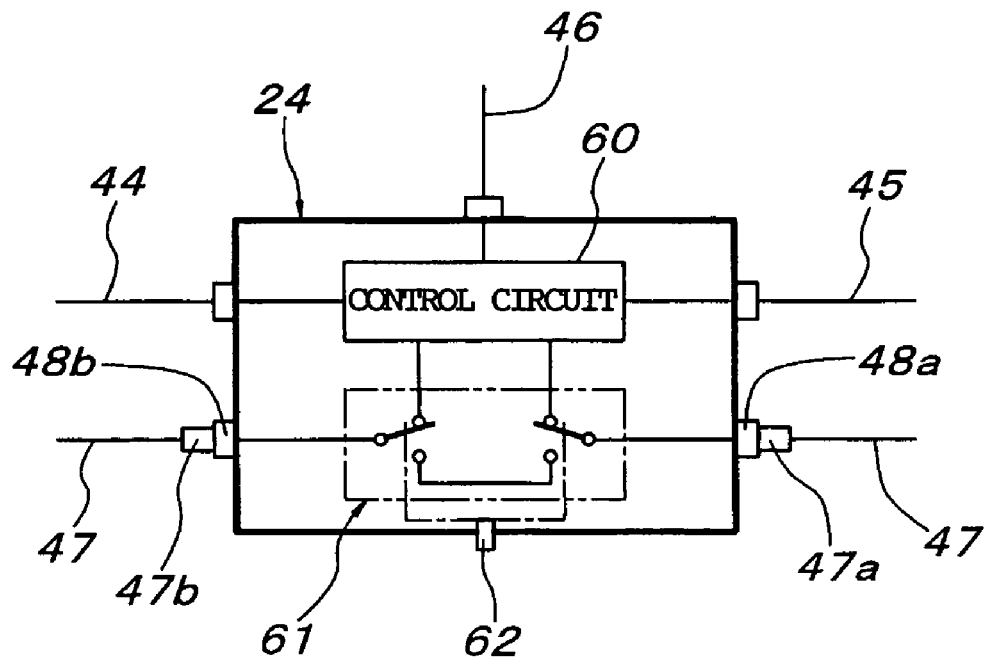
FIG. 18 is a block diagram of a control box in modified form of the conveyor according to the third embodiment.

FIG. 18 shows a structure that may replace the mechanical cable connection shown in FIGS. 16A and 16B. With reference to FIG. 18, a control box 24 contains a control circuit 60 and a switching circuit 61. The control circuit 60 implements the control according to the flowchart shown in FIG. 11. This control box 24 is fitted with a switch button or knob 62 on its outside for switching the switching circuit 61 between a first state and a second state. In the first state, the switching circuit 61 allows the control signal on the control cable 47 connected to the forward next control box 24 to be input into the control circuit 60, and also allows the control signal from the control circuit 60 to be output to the control cable 47 connected to the backward next control box 24. In the second state, the switching circuit 61 does not allow the control signal on the control cable 47 connected to the forward next control box 24 to be input into the control circuit 60, but outputs this signal directly to the control cable 47 connected to the backward next control box 24.

There may be a case where it is obvious that what needs to be removed due to failure or the like is only the drive unit 23 connected to a control box 24 as shown in FIG. 18. In this case, without disconnecting the associated control cables 47 from the control box 24, it is possible to remove only the drive units 23 and switch the switching circuit 61 to the second state by means of the switch button or knob 62 so as to directly send a control signal from the forward next control box 24 to the backward next control box 24. The control cables 47 may be disconnectable from the control box 24 and directly connectable to each other via a male plug 47a and a female plug 47b. This makes it possible to conveniently remove the control box 24.

The switching circuit 61 may be either electronic or mechanical. The embodiment shown in FIGS. 16A, 16B, 17 and 18 might be applied to the relationships among the control box 53 of each second path section A2 and the control boxes 24 of the two adjacent first path sections A1 of the second embodiment shown in FIGS. 13–15.

The present invention is not limited to the preferred embodiments. The carriers 1 do not need to be driven by frictional wheels 30 all along the track. The carriers 1 may be driven by frictional wheels 30 only along one or more sections of the track and by other drive means along another or other sections of the track. The friction drive conveyor according to the present invention is not limited to a conveyor including carriers 1 that run over a floor, as shown in the drawings, but may be any other friction drive conveyor. The friction drive conveyor may be a trolley conveyor including carriers that run under a ceiling. The friction drive conveyor may be a power roller bed type conveyor as described below.

The power roller bed type friction drive conveyor includes carriers without wheels. The carriers are supported by a roller way consisting of sections of a preset length, which may be roughly equal to the length of the carriers. A drive is provided for each of the way sections and includes motor-driven friction rollers, which are fitted in the associated section. The drive also includes a motor for driving all the associated rollers at the same time to move the carriers forward. A controller is provided for each of the way sections to control the associated motor. The drive further includes a sensor for sensing the carrier present in the associated section.

What is claimed is:
1. A friction drive conveyor comprising:
a plurality of carriers movable in a running direction along a track; the carriers each having a frictional surface extending in the running direction;
a plurality of frictional wheels arranged at generally fixed locations along the track side so as to come into contact with the frictional surfaces of the carriers to propel the carriers along the track;
the track including a section in which the frictional wheels are arranged at regular intervals of a distance not longer than the length of the frictional surface;
brakeless motors each assigned to one of the frictional wheels for driving the frictional wheel;
sensors assigned to each of the frictional wheels for sensing whether or not the frictional wheel is in contact with the frictional surface of one carrier;
the sensors each adapted to output a sensing signal;
a controlling means for controlling each of the brakeless motors,
means for transmitting the sensing signal for one frictional wheel to the controlling means for a rearwardly adjacent motor so as to start rotating a rearwardly adjacent frictional wheel in contact with the frictional surface of one carrier when a forwardly adjacent frictional wheel becomes free of the frictional surface of the next preceding carrier, and so as to automatically stop rotating a frictional wheel at the time of its becoming free of the frictional surface of a carrier.
2. A friction drive conveyor according to claim 1, wherein the regular intervals at which the frictional wheels are arranged are of a distance substantially equal to the length of the frictional surface.

3. A friction drive conveyor according to claim 1, wherein each of the carriers includes a load bar, on one side of which the associated frictional surface extends, the load bar including:
- a forward protrusion protruding from the front end of the load bar at a first height; and
- a backward protrusion protruding from the rear end of the load bar at a second height different from the first height;
- the frictional surface extending into the two protrusions;
- wherein, when any one of the carriers is closest to the preceding carrier, the load bars of the two carriers are in end-to-end contact with each other while one of the adjacent protrusions of the two load bars is positioned under the other; and
- wherein, when the two load bars of the two carriers are in end-to-end contact with each other, the frictional surfaces of the two bars overlap with each other at the adjacent end portions by a distance "d" in the running direction; and
- wherein the regular intervals at which the frictional wheels are arranged are set at a distance shorter than the length of the frictional surface of each of the load bars by the distance "d".

4. A friction drive conveyor according to claim 1, wherein
(a) said means for transmitting comprises cables connected between successive, adjacent controllers for the respective motors so that a control signal from a controller for one of the frictional wheels can be sent to the controller for the backwardly adjacent frictional wheel through the associated cable, and
(b) switching means for disconnecting from one of the controllers the two cables connected thereto, and for connecting the disconnected two cables directly to each other.

5. A friction drive conveyor according to claim 4, wherein the cables are detachable from the controllers, and wherein each of the switching means is a connector for directly connecting the two cables disconnected from the associated controller.

6. A friction drive conveyor according to claim 4, wherein the controllers comprises a control circuit, and each of the switching means is a switching circuit incorporated in the associated controller, the switching circuit adapted to change over between:
- a first state in which the switching circuit allows the control signal on the cable connected from the forwardly adjacent controller to a particular controller to be input into a control circuit in the particular controller, and also allows the control signal from the control circuit in the particular controller to be output to the cable connected to the backwardly-adjacent controller; and
- a second state in which the switching circuit does not allow the control signal on the cable connected from the forwardly adjacent controller to the particular controller to be input into the control circuit in the particular controller, but allows the control signal on the cable connected from the forwardly adjacent controller to be output directly to the cable connected to the backwardly adjacent controller.

7. A friction drive conveyor comprising:
a plurality of carriers movable in a wnning direction along a track, the track including a first section and a second section;
the carriers each having a frictional surface extending in the running direction;
a plurality of first frictional wheels arranged at generally fixed locations in the first section on the track side so as to come into contact with the frictional surfaces of the carriers to propel the carriers in the first section;
the first frictional wheels arranged at regular intervals, in the first section, of a distance not longer than the length of the frictional surface;
a plurality of second frictional wheels arranged in the second section on the track side so as to come into contact with the frictional surfaces of the carriers to propel the carriers in the second section;
the second frictional wheels arranged at intervals, in the second section, of a distance shorter than the regular intervals;
brakeless motors assigned to each of the first frictional wheels for driving the first frictional wheels;
at least one motor for driving the second frictional wheels;
a first sensing means including first sensors assigned to each of the first frictional wheels for sensing whether or not the first frictional wheel is in contact with the frictional surface of one carrier;
the first sensors each adapted to output a first sensing signal;
a second sensing means for sensing whether or not any of the carriers is present in the second section;
the second sensing means adapted to output a second sensing signal;
a first controlling means for controlling each of the brakeless motors of said first section,
first means for transmitting said first sensing signals for said first friction wheels to the first controller means for a rearwardly adjacent motor so as to start rotating a rearwardly adjacent frictional wheel in contact with the frictional surface of one carrier when the forwardly adjacent frictional wheel becomes free of the frictional surface of the next preceding carrier, and so as to automatically stop rotating the forwardly adjacent first frictional wheel at the time of its having become free of the frictional surfaces; and
a second controlling means, including second signal transmitting means, for controlling all the second frictional wheels as one group in a manner corresponding to the control of a first frictional wheel, so that a carrier can be propelled in the second section in the manner that carriers are propelled in the first section.

8. A friction drive conveyor according to claim 7, wherein the second control means controls all the second frictional wheels so as to start and stop rotating the second frictional wheels in a batch.

9. A friction drive conveyor according to claim 8, wherein the second sensing means includes second sensors provided for each of the second frictional wheels, the second sensors each adapted to output a second sensing signal, and wherein the second control means controls the second frictional wheels on the basis of the logical sum of the second sensing signals from the second sensors so as to start and stop rotating the second frictional wheels in a batch.

10. A friction drive conveyor comprising:
a plurality of carriers movable in a running direction along a track; the carriers each having a frictional surface extending in the running direction;
a plurality of frictional wheels arranged at generally fixed locations along the track side so as to come into contact with the frictional surfaces of the carriers to propel the carriers along the track;

the track including a section in which the frictional wheels are arranged at regular intervals of a distance not longer than the length of the frictional surface;

brakeless motors each assigned to one of the frictional wheels for driving the frictional wheel;

sensors assigned to each of the frictional wheels for sensing whether or not the frictional wheel is in contact with the frictional surface of one carrier;

the sensors each adapted to output a sensing signal;

a controlling means for controlling each of the brakeless motors on the basis of the sensing signals from each of the sensors so as to start rotating a particular frictional wheel in contact with the frictional surface of one carrier when a forwardly adjacent frictional wheel gets free of the frictional surface of another preceding carrier, and so as to stop rotating the frictional wheels at the time of their becoming free of the frictional surfaces;

the track including a plurality of guide rail units of a suitable length connected end to end, the rail units each including:

a cable rack connected to the racks of the adjacent rail units; and a power supply cable extending through the cable rack;

the power supply cable fitted with end connectors for connecting the cable with the other cables of the adjacent rail units and to a branch connector;

wherein the branch connectors of the supply cables of the rail units can be connected with branch cables, through which the motors can be supplied with power from the power supply cables.

11. A friction drive conveyor according to claim 10, wherein each of the guide rail units is substantially equal in length to the intervals at which the frictional wheels are arranged;

the guide rail units each fitted with a drive unit;

the drive unit including one frictional wheel and the associated motor.

12. A friction drive conveyor according to claim 11, wherein each of the guide rail units includes:

a pair of rails extending side by side; and a plurality of yokes which are fixed at both ends and a middle point of the rails so as to integrate the rails;

the yokes supporting the associated cable rack under the associated rails;

wherein one of the yokes is fitted with the associated drive unit; and wherein the guide rail units are connected end to end by the yokes at both ends of the rail units.

* * * * *